(12) United States Patent
Ellinger et al.

(10) Patent No.: US 12,442,816 B2
(45) Date of Patent: Oct. 14, 2025

(54) SENSOR BODY FOR BINDING AND/OR ENRICHING AND/OR DETECTING AN ANALYTE IN A SAMPLE

(71) Applicant: BLINK AG, Jena (DE)

(72) Inventors: Thomas Ellinger, Jena (DE); Eugen Ermantraut, Jena (DE); Katrin Steinmetzer, Jena (DE); Stephan Hubold, Jena (DE); Ivan Loncarevic, Jena (DE); Torsten Schulz, Jena (DE)

(73) Assignee: BLINK AG, Jena (DE)

( * ) Notice: Subject to any disclaimer, the term of this patent is extended or adjusted under 35 U.S.C. 154(b) by 1297 days.

(21) Appl. No.: 16/957,594

(22) PCT Filed: Dec. 27, 2018

(86) PCT No.: PCT/EP2018/097047
§ 371 (c)(1),
(2) Date: Jun. 24, 2020

(87) PCT Pub. No.: WO2019/129825
PCT Pub. Date: Jul. 4, 2019

(65) Prior Publication Data
US 2021/0223236 A1     Jul. 22, 2021

(30) Foreign Application Priority Data
Dec. 29, 2017 (EP) .................................. 17211155

(51) Int. Cl.
*G01N 33/543* (2006.01)
*B01J 20/26* (2006.01)

(52) U.S. Cl.
CPC ...... *G01N 33/54313* (2013.01); *B01J 20/265* (2013.01); *G01N 33/54306* (2013.01)

(58) Field of Classification Search
None
See application file for complete search history.

(56) References Cited

U.S. PATENT DOCUMENTS

2009/0087346 A1    4/2009   Luchini

FOREIGN PATENT DOCUMENTS

| EP | 3343223 A1 | 7/2018 |
|---|---|---|
| JP | 2003-321492 A | 11/2003 |

(Continued)

OTHER PUBLICATIONS

Golden et al., "Simple Fluidic System for Purifying and Concentrating Diagnostic Biomarkers Using Stimuli-Responsive Antibody Conjugates and Membranes", Bioconjugate Chem., 2010, 21, pp. 1820-1826. (Year: 2010).*

(Continued)

*Primary Examiner* — Rebecca M Giere
(74) *Attorney, Agent, or Firm* — SALIWANCHIK, LLOYD & EISENSCHENK

(57) ABSTRACT

The present invention relates to a sensor body for binding and/or enriching an analyte. Furthermore, the present invention relates to a method of binding an analyte to a sensor body. Furthermore, the present invention also relates to a method of enriching and/or washing an analyte bound to a sensor body and to a method of detecting an analyte in a sample. Moreover, the present invention relates to a device for binding and/or enriching and/or detecting an analyte in a sample.

Figure 1:
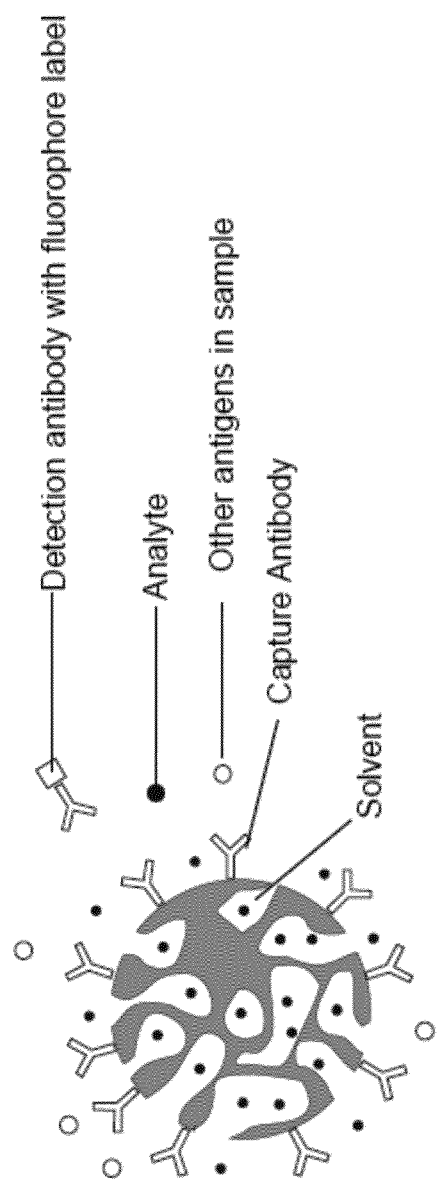

5 Claims, 10 Drawing Sheets
Specification includes a Sequence Listing.

(56) References Cited

FOREIGN PATENT DOCUMENTS

| | | |
|---|---|---|
| JP | 2009-510442 A | 3/2009 |
| WO | 200060332 A2 | 10/2000 |
| WO | 2007038523 A2 | 4/2007 |
| WO | 2010102162 A1 | 9/2010 |

OTHER PUBLICATIONS

Office Action issued by the Japanese Patent Office dated Nov. 28, 2022 with respect to the Japanese priority application No. 2020-536051 with English translation.
Examination Report issued by the European Patent Office dated Jan. 5, 2023 with respect to the European priority application No. 18 833 249.8.
Auditore-Hargreaves, Karen, et al. "Phase-Separation Immunoassays" Clin. Chem, Sep. 1, 1987, pp. 1509-1516, vol. 33, No. 9 (American Association for Clinical Chemistry, Washington, DC).
Monji, Nobuo et al. "A Novel Immunoassay System and Bioseparation Process Based on Thermal Phase Separating Polymers" Applied Biochemistry and Biotechnology, Mar. 1, 1987, pp. 107-120, vol. 14, No. 2 (Humana Press Inc., New York).

\* cited by examiner

SENSOR BODY FOR BINDING AND/OR ENRICHING AND/OR DETECTING AN ANALYTE IN A SAMPLE

This application is a National Stage Application of International Application Number PCT/EP2018/097047, filed Dec. 27, 2018; which claims priority to European Application No. 17211155.1, filed Dec. 29, 2017.

The Sequence Listing for this application is labeled "SeqList-15Jun20-ST25.txt", which was created on Jun. 15, 2020 and is 3 KB. The entire content is incorporated herein by reference in its entirety.

The present invention relates to a sensor body for binding and/or enriching an analyte. Furthermore, the present invention relates to a method of binding an analyte to a sensor body. Furthermore, the present invention also relates to a method of enriching and/or washing an analyte bound to a sensor body and to a method of detecting an analyte in a sample using said sensor body. Moreover, the present invention relates to a device for binding and/or enriching and/or detecting an analyte in a sample.

The most popular form of binding assays utilizes a binding member immobilized to a substrate, preferably to micro-particles or micro-spots, which bind the analyte of interest. In a sandwich configuration a second labelled binding partner is bound to the analyte. Upon removing unbound label by some kind of wash step the amount of label bound to the sensor body is detected and quantified. The detected signal is indicative of the amount of analyte in the sample. The outlined methodology and variations thereof (competitive binding assay, sandwich capture assay, etc.) are well known [1]. Any binding assay comprises the steps of analyte binding, washing in order to removing nonspecifically bound material, labeling the bound analyte, a washing step to remove non-specifically bound label and finally the step of detecting and quantifying the amount of bound label which (based on some form of calibration) can be considered indicative for the amount of analyte present in the sample. From a practical point of view it is highly desirable to reduce the number of steps required to perform a binding assay. Moreover any washing steps requires careful handling. Along with non-specifically bound material specifically bound material is removed. This results in lower analyte specific signals to be detected. Any variability in the steps to be performed will have an impact on the signal and will thus affect the precision of the test assay. Basically binding assays can be discriminated into the categories of heterogeneous and homogenous assays [2]. The former offer the advantage of being able to use comparably simple detection setups and reagents whereas the latter provide for a simplified workflow reducing handling steps to a minimum. In heterogeneous assays, the signal emitted by the bound labeled reactant is indistinguishable from the signal emitted by the free labeled reactant. Therefore, a separation step is required to distinguish between the two. Typical heterogeneous immunoassays include radioimmunoassay (RIA) and enzyme-linked immunosorbent assay (ELISA). In a homogeneous assay, the signal emitted by the specifically bound labeled reactant is different from the signal emitted by the free labeled reactant. Homogeneous assays achieve their specificity by the use of specialty reagents that allow to discriminate between the bound and unbound states of the labels to the analyte.

For assays requiring exquisite sensitivity and quantification heterogeneous assays are still the gold standard [3].

In order to increase the amount for bound analyte and thus the signal to be detected porous sensor matrices in the form of micro-particles with an increased binding area have been employed [4]. However porous materials do also require more careful washing in order to remove non-specifically bound signal generating entities. This requires additional time and more liquid volume if compared to solid particles with an essentially plain surface as the entire surface including porous inner parts of the sensor body need to be exposed to the washing liquid. Particularly time consuming is also the removal out of the porous matrix of the non-specifically bound signal generating entities set free by the washing solvent. If this process solely relies on passive diffusion it is very slow and can be rather inefficient. Thermo-responsive polymers have been previously employed for performing immunoassays (Auditore-Hargreaves, Monji [5-7]), such that a conjugate of a thermoresponsive polymer and an antibody was used to bind an analyte and a second, dye labeled antibody was used to establish a sandwich configuration. Upon setting the temperature of the solution above the critical solution temperature of the polymer an unspecified and precipitated aggregate is formed in-situ due to the induced phase change of the polymer. The signal content attached to the formed particles is proportional to the amount of antigen in the sample. The methodology is difficult to control since it requires the in-situ formation of a polymer matrix and/or the precipitation of polymer aggregates, which, prior to precipitation are not detectable and/or visibly discernible and are difficult to handle due to their lack of defined dimensions.

Therefore assays and reagents facilitating high signal to background signal and minimal handling requirements are highly desirable.

There is furthermore a need in the art for homogeneous assays allowing the generation of a high signal to noise ratio and that do not require expensive or tedious working protocols.

In a first aspect, the present invention relates to a sensor body for binding and/or enriching an analyte, said sensor body comprising a porous polymeric scaffold and an interstitial pore space within said polymeric scaffold, wherein said porous polymeric scaffold is composed of a polymer responsive to the change of at least one external condition to which said sensor body is exposed, e.g. pH, temperature, salt conditions, presence or absence of chemicals, wherein one or more capture agents for an analyte is/are attached to said porous polymeric scaffold.

In one embodiment, said polymer responsive to the change of at least one external condition to which said sensor body is exposed, is a thermoresponsive polymer which is either a thermoresponsive polymer having a lower critical solution temperature (LCST polymer), preferably selected from poly(N-isopropylacrylamide) (pNIPAM), poly[2-(dimethylamino)ethyl methacrylate](pDMAEMA), hydroxypropylcellulose, poly(vinylcaprolactame) (P(VCL), and polyvinyl methyl ether, or said thermoresponsive polymer is a thermoresponsive polymer having an upper critical solution temperature (UCST), preferably selected from poly(N-acryloyl glycinamide) (PNAGA), poly(allylamine)-co-poly(allylurea) and its derivatives, poly(methacrylamide), poly(N-acryloylaspargineamide), poly(N-methacryloylglutamineamide), poly(acrylamide)-co-(acrylonitrile). poly(sulfobetaine)s, poly(phosphorylcholine)s.

In one embodiment, said responsive polymer, in particular said thermoresponsive polymer is crosslinked, preferably either by at least one crosslinking reagent bridging and interconnecting between different polymer chains within said polymer, or by the provision of a substrate, in particular a substantially planar substrate, adjacent to said sensor body, and by interfacial crosslinking of different polymer chains of said polymer to said substrate, in particular to a surface of said substrate. It should be noted that said at least one crosslinking reagent is preferably not an antibody or antibody fragment. It is also preferably not an antibody or antibody fragment linked to another antibody, e.g. directly or through a common or joint antigen. According to embodiments of the present invention, the crosslinking reagent bridging and interconnecting between different polymer chains within said polymer is an agent which can react with two or more groups on the polymer. Therefore, polymers with reactive side groups, such as hydroxyl, amide, or carboxyl, will be the easiest to crosslink. Examples of suitable crosslinking reagents include acetaldehyde, formaldehyde, N, N'-methylene-bis acrylamide, ethylene glycol dimethacrylate, glycerine triacrylate, divinyl benzene, glutaraldehyde, diglycidyl ether, divinyl sulfone, diisocyanates, epichlorohydrin, phosphoryl chloride, trimetaphosphate, trimethylol melamine, and polyacrolein.

In one embodiment, said sensor body has the capability of reversibly adopting an expanded and a contracted state, and wherein, preferably, the interstitial pore space has a volume which is at least 50%, preferably at least 60%, more preferably at least 70%, even more preferably at least 80% and even more preferably at least 90% of the total volume of said sensor body when said sensor body is in said expanded state.

In one embodiment, approximately 10%-90% of the total volume of said interstitial pore space are not accessible to said analyte, but are accessible to a solvent, preferably water In one embodiment, said analyte is a biomolecule selected from nucleic acids, preferably DNA or RNA, nucleotides, oligonucleotides, proteins and peptides, lipids, e.g. phospholipids, wherein preferably said biomolecule has a size >0.1 kDa, e.g. 0.5 kDa, preferably >5 kDa, more preferably >10 kDa, even more preferably >50 kDa, or wherein said analyte is a virus or a cell.

In one embodiment, said interstitial pore space is dimensioned to accommodate liquid from a liquid sample containing or suspected of containing said analyte.

In one embodiment, said sensor body is not a core-shell particle.

In one embodiment, said capture agent(s) is (are) specific for a given analyte and is(are) selected from antibodies, antibody fragments, nucleic acids, including aptamers, spiegelmers, non-antibody proteins capable of specifically binding an analyte or analyte complex, such as receptors, receptor fragments, affinity proteins, e.g. streptavidin, chemical moieties such as Biotin, a Strep-tag®, Digoxigenin, Dinitrophenol a nucleic acid or nucleic acid analogue-tag or similar chemical moieties capable of being specifically bound, with an affinity in the range of from $K_D=10^{-8}$ to $10^{-15}$ M, by antibodies, antibody fragments, nucleic acids, including aptamers, spiegelmers, non-antibody proteins, such as receptors, receptor fragments, affinity proteins, e.g. streptavidin, or is(are) selected from hydrophobic structures capable of specifically binding hydrophobic molecules or molecules with hydrophobic groups, wherein preferably, said hydrophobic structures have a log D greater than 2 under the conditions in which said detection of said analyte is performed.

The term "log D", as used herein, is meant to refer to the logarithm of the distribution-coefficient (D), which is the ratio of concentrations of a compound in a mixture of two immiscible phases at equilibrium. In a preferred embodiment, the term "distribution coefficient" as used herein, is used synonymously with "partition coefficient". In a preferred embodiment, the "distribution coefficient" refers to the ratio of concentrations of a compound in a mixture of water and 1-octanol. Typically, measurement of such distribution coefficient is done by any suitable methodology known to a person skilled in the art. Such suitable methodologies include the "shake-flask method" in which the compound in question is dissolved in a volume of octanol and water and in which then further the concentration of such compound in each solvent is measured. Other suitable methodologies include high-performance liquid chromatography (HPLC). In such HPLC-methodology, the distribution coefficient (D) and its logarithm can be determined by correlating its retention time with similar compounds with known distribution coefficient values.

In one embodiment, the sensor body is either a solitary particle which preferably is freely diffusible, or said sensor body is a spot immobilized on a surface of a substrate.

In a further embodiment, said sensor body is a coating of a defined area on a surface of a substrate. In those embodiments, where the sensor body is a spot or a coating on a surface of a substrate, the present invention also envisages and encompasses an assembly of said spot and said substrate, or an assembly of said coating and said substrate, which assembly forms part of the invention.

In one embodiment, the sensor body is a solitary particle which preferably is freely diffusible, wherein said solitary particle has a spherical or globular shape, and preferably has a spherical or globular shape and clearly delimited boundaries that can be visibly observed, preferably in a microscope or other optical means.

In one embodiment, the sensor body has an average diameter in the range of from 1 μm to 1 mm.

In one embodiment, the sensor body is a spot immobilized on a surface of a substrate, wherein said spot has clearly delimited boundaries that can be visibly observed, preferably in a microscope or other optical means, and preferably covers an average fixed area on the substrate in the range of from 1 μm$^2$ to 1 mm$^2$, and wherein the thickness of said spot varies depending on the external conditions to which said spot is exposed and thus depending on whether said spot is in an expanded or a contracted state.

In one embodiment, said sensor body is a coating of a defined area on a surface of a substrate.

In such embodiment, said coating has clearly delimited boundaries that can be visibly observed, preferably in a microscope or by other optical means.

In a further aspect, the present invention relates to a method of binding an analyte to a sensor body, said method comprising the steps:

a) providing, in any order, a sensor body according the present invention, as defined herebefore, and an aqueous sample suspected of containing an analyte;

b) exposing said sensor body to said aqueous sample, thereby allowing an analyte present in said sample to bind to said sensor body and allowing liquid to enter said interstitial pore space of said sensor body.

It is preferred that when said sensor body is exposed to said aqueous sample, the sensor body is subjected to conditions allowing for the sensor body to adopt an expanded state. Such an expanded state favours any analyte present in said sample to bind to said sensor body and also favours the entry of liquid into the interstitial pore space of said sensor body.

In preferred embodiments of the method(s) according to the present invention described herein, the at least one external condition to which said sensor body is exposed and to which said polymer of said sensor body is responsive to, is temperature, and the responsive polymer is a thermoresponsive polymer.

In a further aspect, the present invention relates to a method of enriching and/or washing an analyte bound to a sensor body, said method comprising the steps:
c) Performing the method of binding an analyte to a sensor body as defined herebefore;
d) Changing the state of said sensor body from an expanded to a contracted state and thereby displacing said liquid contained in said interstitial pore space of said sensor body, by changing at least one external condition to which said sensor body is exposed, e.g. one of temperature, pH, salt concentration, presence or absence of chemicals;
e) Changing the state of said sensor body from a contracted to an expanded state and thereby allowing liquid to enter said interstitial pore space of said sensor body, by changing at least one external condition to which said particle is exposed, e.g. one of temperature, pH, salt concentration, presence or absence of chemicals;
wherein steps d) and e) are performed after step c) when the analyte has been bound to said particle, and wherein the analyte is either labelled or unlabelled;
wherein steps d) and e) are repeated n-times, wherein n is an integer in the range of from 1-1000, preferably 1-500, preferably 1-250, more preferably 1-100, even more preferably 1-50 more preferably 1-40, e.g. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, and even more preferably 1-20, e.g. 1, 2, 3, 4, 5, 6, 7, 8, 9, 10, 11, 12, 13, 14, 15, 16, 17, 18, 19, 20.

In one embodiment n is selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30. When steps d) and e) are repeated n-times, with n>1, it is possible to achieve an extremely high purity of the analyte, i.e. the analyte can be obtained in extremely pure form and/or devoid of contaminants.

In one embodiment and/or typically, during performance of said steps c)-e), said sensor body is surrounded by a bulk aqueous solution, e.g. said aqueous sample, and during at least one of said steps c)-.e), said bulk aqueous solution is agitated, thus causing a liquid exchange around said sensor body. An agitation of said bulk aqueous solution may be achieved by any suitable means e.g. stirring, shaking, whisking, battering or any other mechanical action suitable to achieve a movement of said bulk aqueous solution. In one embodiment, said method including steps c) and e) is performed with the sensor body (or a plurality of sensor bodies) and said aqueous sample suspected of containing an analyte, being contained in a reaction vessel, and in such embodiment including a reaction vessel, and agitation may be achieved simply by moving, e.g., shaking said reaction vessel. Without wishing to be bound by any theory, the present inventors believe that the combination of a repetition of steps d) and e), together with an agitation of the bulk aqueous solution surrounding said sensor body, causes a substantial material flow across the porous polymeric scaffold and/or the interstitial pore space of said sensor body and/or any capture agent attached to said porous polymeric scaffold, thus allowing for an efficient binding of any analyte to said sensor body. The agitation of the bulk aqueous solution surrounding said sensor body affords efficient microscopic liquid exchange around the sensor body, thus contributing to the material flow mentioned above.

Furthermore, a repetition of steps d) and e), alone or in combination with an agitation of the bulk aqueous solution surrounding said sensor body, allows a performance of the method(s) in a single vessel, and obviates the need for any transfer steps (e.g to other environments, such as other vessels). By way of explanation, the sensor body after having been exposed to said aqueous sample suspected of containing an analyte, does not have to be removed from said vessel in which exposure has taken place, in order for an enrichment of said analyte by said sensor body to occur.

In a further aspect, the present invention relates to a method of detecting an analyte in a sample, said method comprising the steps:
Performing the method of binding or the method of enriching and/or washing as defined herebefore; wherein the analyte is or becomes labelled either before, during or after binding said analyte to said sensor body;
Detecting the analyte bound to said sensor body by detecting the label bound to said sensor body, preferably in the presence of unbound label.

In embodiments of the method of detecting an analyte, as defined above, this entails a performance of steps a) and b), as defined above, (→ method of binding an analyte to a sensor body). A performance of steps a) and b) is herein also sometimes referred to as a performance of step c), i.e. performing step c) means to perform steps a) and b). Thereafter in some embodiments, a performance of steps d) and e) occurs (→ method of enriching and/or washing an analyte bound to a sensor body), and such performance may be repeated n-times, as defined above. Furthermore the method of detecting an analyte according to the present invention finally entails the detection of the analyte bound to said sensor body. In order for this to occur, preferably, the analyte is or becomes labelled either before, during or after binding the analyte to said sensor body. Detection of said analyte is achieved by detecting the label bound to said sensor body. A labelling of the analyte may be achieved by any suitable means, e.g. through a dye, a labelled antibody etc.

In accordance with embodiments of the present invention, the method of detecting an analyte is performed in a single reaction vessel, i.e. steps a)-e) AND the detection step. In one embodiment, such method is performed without any washing step or any step aimed at removing unbound label. The detectable signals that can be achieved in accordance with the present invention do not necessitate the removal of any (unwanted) background signal, e.g. fluorescence background.

According to a further aspect, the present invention also relates to a device for binding and/or enriching an analyte, said device comprising:
a container for receiving a plurality of sensor bodies as defined herein and for receiving an aqueous sample suspected of containing an analyte;
a plurality of sensor bodies as defined herein, contained in said container, wherein the polymeric scaffolds of said sensor bodies are composed of a thermoresponsive polymer;
means for controlling and cyclically changing the temperature in said container, and
optionally, means to mechanically agitate an aqueous sample, if present in said container.

In one embodiment, the device according to the present invention further comprises:
an optical detector configured to detect sensor bodies within said container and changes, if any, in size, appearance, light absorption, light emission and/or fluorescence of said sensor bodies. Such changes may for example occur upon binding of an analyte, preferably a labelled analyte, to said sensor bodies. In those embodiments where the device also comprises an optical detector configured to detect sensor bodies within said container and changes in size, appearance, liquid absorption etc. of said sensor bodies, the device may effectively, be used as a device for detecting an analyte in a sample. This is because typically the changes in size, appearance, light absorption, light emission and/or fluorescence of said sensor bodies may occur upon binding of an analyte to said sensor bodies.

In embodiments of the device according to the present invention, the means for controlling and cyclically changing the temperature in said container may be any suitable means, such as one or several Peltier elements, alone or in conjunction with a heat sink, which Peltier element(s) is (are) thermally coupled with the container. Preferably, such means for controlling anc cyclically changing the temperature in said container is computer controlled, i.e. connected to a suitable computer, which can be operated by a user. E.g. the user can program how many temperature changes are to be performed and what temperature values are to be reached/maintained, what the incubation intervals, if any, are between the temperature changes etc.

In the embodiment where the device according to the present invention further comprises an optical detector, it is preferred that the analyte is or becomes labelled either before, during or after binding said analyte to said sensor bodies. This is particularly so, if the analyte itself is not already easily detectable by optical means. In this embodiment, i.e. when the analyte is specifically labelled, once the analyte has been bound to said sensor bodies, it can be detected using said optical detector. In the embodiment where the device according to the present invention further comprises an optical detector, the container is at least partially transparent (for the wavelength range over which detection occurs) in order to allow optical detection of said sensor bodies and/or said analyte bound to said sensor bodies in said container, by said optical detector. In embodiments of the present invention it is preferred that the container can be sealed or closed, thus providing a defined reaction space or incubation space.

Suitable labels for the analyte are known to a person skilled in the art and may e.g. be fluorescent or visible dyes which may be bound to said analyte directly or through other means, e.g. an antibody. Sometimes herein, such labelled antibody is herein also referred to as a labelled detection antibody ("labelled detection AB").

In embodiments where the device according to the present invention further comprises means to mechanically agitate an aqueous sample if present in said container, it is possible to mechanically agitate the sample suspected of containing an analyte and to thereby achieve an efficient macroscopic liquid exchange around the sensor body/bodies. Without wishing to be bound by any theory, the present inventors believe that such mechanical agitation adds to and supports the material flow across any binding surface (such as the interstitial pore space within said sensor body or the capture agent(s) attached to the porous polymeric scaffold of said sensor body/bodies, and thereby enhances the efficiency of any binding of analyte to said sensor body/bodies. The means to mechanically agitate an aqueous sample may be any suitable means, such as a stirrer, a pump, means to move the container (and thus any sample within it) etc.

The present inventors describe macroscopic pre-made sensor bodies with defined dimensions and being detectable both, in their expanded and in their contracted state. The body can be observed as an individual structure before the binding is performed, during the incubation/enrichment process and for detecting the bound analyte. Moreover, the individual sensor body element can be subjected to multiple phase contraction/swelling cycles. Structural integrity is preferably achieved by crosslinking the polymers. Crosslinking is accomplished either by employing specific cross linking reagents bridging between polymer chains in three dimensions or by employing a suitable (planar) substrate providing for a connection between the polymer chains through immobilization to this single surface.

The sensor body is typically arranged in the form of free floating particles or in the form of sensor-spots on a planar substrate. The sensor body has a defined size and shape in its expanded state and in its contracted state, respectively. The difference in volume between the two states is proportional to the total pore volume accessible to the aqueous solvent in the expanded state. Useful sensor bodies are preferably characterized by a volume difference of >50%, preferably more than 80% and ideally more than 90% between the two states. In addition the sensor bodies are characterized by a characteristic pore size distribution with some pores being accessible to the analyte/label and others being too small and only accessible to the solvent.

In yet a further aspect, the present invention relates to a use of a sensor body according to the present invention for enriching and/or for purifying and/or washing and/or detecting an analyte.

In one embodiment of said use, said analyte is bound to a surface or becomes bound to a surface during such use, wherein, preferably, said surface is a surface of said sensor body.

In one embodiment, said analyte is labelled with a detectable label.

In one embodiment said analyte is comprised in a sample, wherein said sample is an aqueous solution or is a body fluid, preferably selected from blood, blood plasma, serum, saliva, urine, tears, sweat, lymph, semen, and cerebrospinal fluid.

In accordance with embodiments of the present invention, the present inventors have devised embodiments of a sensor body for binding and/or enriching an analyte, wherein the sensor body comprises a porous polymeric scaffold and an interstitial pore space within said polymeric scaffold. The sensor body may be used for a plethora of applications, including binding assays, purification protocols, detection methods, amplification methods and similar methods. The porous polymeric scaffold of said sensor body is preferably composed of a thermoresponsive polymer, and one or more capture agents are attached to said porous polymeric matrix. The use of a thermoresponsive polymer allows for the sensor body to adopt two different states, namely one state, in which the sensor body is expanded and, when subjected to an aqueous solvent, is even in a swollen state. In the other state, the sensor body is contracted, and the majority of solvent previously occupying the interstitial pore space, is displaced. The sensor body in accordance with the present invention can be cycled between the two states, thus allowing for the reversible uptake and expulsion of water from the interstitial pore space which allows for a washing of the sensor body and any analyte attached thereto without the need to use fresh liquid/buffer.

The term "sensor body", as used herein, is meant to refer to a physical entity which comprises a porous polymeric scaffold and an interstitial pore space within said polymeric scaffold. A sensor body, in accordance with embodiments of the present invention, may be a particle that is unattached to any surface, or it may be a spot that is immobilized on a surface of a substrate. In either case, the outer physical boundaries of said sensor body, i.e. of said particle and of said spot are optically discernible and may be visibly observed or detected, preferably with a microscope or other optical means, in both states. If the sensor body is configured to be in a particle form, it is typically a solitary particle that is unattached to a surface of a substrate or another particle or entity. In a preferred embodiment, it is freely diffusible, for example when in an aqueous environment, and is free floating. If the sensor body is configured to be in a spot-form, it is typically immobilized on a surface of a substrate, preferably a surface of a substantially planar substrate. In this case, the sensor body, i.e. spot, is immobilized, and therefore is not freely diffusible and not free floating, when in an aqueous environment. If the sensor body is configured to be in a spot-form, it may also be configured to be an array of spots immobilized on a surface. Immobilization of such spot(s) on a surface may be done by any suitable means and typically involves a crosslinking of the polymer(s) from which said spot is made, on or with the surface. Immobilization of such a spot on a surface of a substrate may be direct without any intervening layer or it may involve the use of a suitable layer, such as an attachment layer that facilitates the immobilization of said spot on said surface. The sensor body may also be configured to provide for an extended coating of some defined surface on a substrate. In embodiments involving a substrate, the present invention also envisages an assembly of said spot and said substrate, or an assembly of said coating and said substrate, which assembly forms part of the invention.

A sensor body, either in its particulate form, its spot-form or as a coating, may adopt two different states, depending on the external conditions to which said sensor body is exposed. Taking temperature as an example for an external condition and assuming an embodiment wherein the sensor body comprises a porous polymeric scaffold which is composed of a thermoresponsive polymer, the sensor body may exist in an expanded state under one set of temperature conditions, and in a contracted state under another set of conditions. If the sensor body is in an aqueous environment and in the expanded state, it is also in a swollen state, meaning that its interstitial pore space is filled to a considerable or large extent with water. Upon a change of conditions, for example in the case of a LCST polymer, upon heating above the lower critical solution temperature (LCST), the polymer gets contracted, the sensor body adopts a contracted state, and any water present within said interstitial pore space gets expelled therefrom. Once the temperature is lowered again below the LCST, the polymer relaxes again, and the sensor body returns to an expanded state again, which allows the uptake of water into the interstitial pore space. Sensor bodies in accordance with the present invention can be reversibly cycled between these two states. Moreover, because of their defined dimensions, as opposed to unspecified aggregates that simply precipitate out of solution upon change of external conditions, sensor bodies in accordance with the present invention are also easy to be handled. This is, because they are prefabricated which means that their manufacture can occur separate from their use in a subsequent detection reaction. Moreover, the sensor bodies in accordance with the present invention can be stored for prolonged periods of time, and they can also be dried, e.g. freeze-dried. Furthermore, they can be easily detected and discerned from their respective surroundings.

Without wishing to be bound by any theory, the present inventors believe that the presence of an interstitial pore space within a sensor body, i.e. within a particle or spot, according to the present invention is achieved by the fact that the polymer from which said sensor body is made, is preferably crosslinked. Such crosslinking may be introduced during the process of polymerization, for example by using a bi- or multifunctional monomer, or by using a separate crosslinking agent altogether, or such crosslinking may also be achieved after polymerization by a subsequent chemical reaction. It should be noted that the/a crosslinking agent according to the present invention is not an antibody or antibody fragment. A typical example of a suitable crosslinking agent, e.g. for pNIPAM, is N,N'-Methylenebisacrylamide. Crosslinking may occur within the bulk of the polymer, in particular with respect to sensor bodies which are configured as particles. Such a crosslinking is herein also sometimes referred to as bulk crosslinking. If the sensor body is configured to be a spot or an array of spots or a surface coating of defined size, crosslinking may be achieved by interfacial crosslinking, meaning that the polymer(s) of said spot(s) or of said coating is(are) crosslinked to a surface of a substrate. However, in addition to such interfacial crosslinking, a spot or coating in accordance with the present invention may nevertheless also include some bulk crosslinking as outlined and defined above.

In accordance with embodiments of the present invention, the porous polymeric scaffold is composed of a polymer that is responsive to an external trigger, wherein such external trigger may be a physical trigger, such as temperature or pressure, or it may be a chemical trigger, such as the presence of absence of certain chemical agents or the pH-value to which said sensor body is exposed. In a preferred embodiment, such external trigger is the temperature, and the responsive polymer is a thermoresponsive polymer, e. g. a lower critical solution temperature (LCST) polymer or an upper critical solution temperature (UCST) polymer.

The term "pore", as used herein, refers to a duct, recess, tunnel, bore or hole in said sensor body into which chemical moieties can diffuse, depending on their size and the size of such pore. The entirety of such pores make up the "interstitial pore space" within said sensor body. The interstitial pore space of said sensor body is comprised within a porous polymeric scaffold of said sensor body. The porous polymeric scaffold of said sensor body is preferably composed of a thermoresponsive polymer. The term "thermoresponsive polymer" refers to a polymer the physical qualities of which, in particular its affinity to water, are dependent on the external temperature to which said polymer is exposed. In one embodiment, a thermoresponsive polymer in accordance with the present invention exhibits a change of affinity to water with temperature. In a preferred embodiment according to the present invention, the thermoresponsive polymer is a thermoresponsive polymer having a lower critical solution temperature (LCST) meaning that below such lower critical solution temperature, the polymer is in a hydrated expanded state; and above the lower critical solution temperature, the polymer is in a contracted non-hydrated state. By cycling the sensor body between the two states, it is possible to repeatedly and reversibly accommodate water/solvent in the sensor body and thereafter expel it again from the sensor body. This achieves a washing effect. Such a washing effect is achieved in particular, when the interstitial pore space has a pore size distribution such that a defined fraction of the total liquid volume accommodated within the particle of e. g. 10%-90% is not accessible to the analyte and/or the label (e.g. because of the size of the analyte). When the sensor body is in an expanded state, the solvent has access to all or substantially all of the pores or a defined fraction of the pores, and the analyte has access to some of the (larger) pores only. When the sensor body is converted in a contracted state, the solvent becomes squeezed out of the interstitial pore space, and only bound analyte remains with/in the sensor body, whereas other (unbound) solutes are washed out because they are not retained by any capture agent of the pores which become "squeezed". In one embodiment, the particulate sensor body according to the present invention has an average size in the range of from 1 µm to 1 mm The term "has an average size in the range of from . . . to . . . ", when used in conjunction with a sensor body in accordance with the present invention, is meant to refer to the longest dimension of such sensor body. In one embodiment, such longest dimension of such sensor body is the diameter of such sensor body, in particular when the sensor body itself has a spherical, quasi spherical, globular, quasi globular or similar "blob-like" or "droplet like" shape.

In one embodiment, in an expanded state of the sensor body, the pores are sized such that the analyte does not have access to more than 90% thereof, whereas water does. This is particularly useful for an enrichment and concentration of analyte on the surface of a sensor body and allows an efficient washing when the sensor body is reversibly cycled between an expanded and a contracted state. In another embodiment, in an expanded state of the sensor body according to the present invention, both the analyte and the solvent have access to most of the pores, e.g. 90% or more. This, effectively, leads to an extremely large surface that is available for binding the analyte, whilst also an efficient washing can be achieved when the sensor body is reversibly cycled between the two states.

In one embodiment, the volume of said sensor body, preferably the volume of said interstitial pore space, defines and limits the dimensions of the space or compartment that is available for binding, enriching, washing or detecting an analyte, i.e. the dimensions of the space or compartment that is available for any use to which said sensor body is put.

In one embodiment, the particulate sensor body or sensor spot according to the present invention comprises a volume in the range of from 0.5 fL (1 µm diameter) to 0.5 µL (1 mm diameter).

The particulate sensor matrices according to the present invention can be easily manufactured, e.g. by emulsion polymerisation of a thermoresponsive of polymer as aqueous droplets in a non-aqueous phase using for example a commercially available droplet generator. The manufacture thereof can be performed separately, both in time and space from a subsequent detection reaction. Subsequently, the thus generated polymer droplets can be transferred from the non-aqueous phase to an aqueous phase. The capture agent(s) may be attached before polymerisation to the individual monomers, or the capture agent(s) may be attached after polymerisation to the thermoresponsive polymer. Sensor spots can be manufactured using state of the art micro-pipetting or micro-arraying technologies by spotting the reagents onto suitable substrates.

In embodiments involving a substrate, the substrate may be any suitable substrate for immobilization of a spot in accordance with the present invention, e.g. a glass slide, a chip etc.

In one embodiment, the sensor body according to the present invention consists of a porous polymeric matrix and an interstitial pore space within said polymeric matrix, wherein said porous polymeric matrix is composed of a thermoresponsive polymer, and wherein one or more capture agents are attached to said porous polymeric matrix.

The term "Strep-tag®", as used herein, typically refers to a peptide with the sequence-Ala-Trp-Arg-His-Pro-Gln-Phe-Gly-Gly-COOH (Strep-tag®) or . . . -Asn-Trp-Ser-His-Pro-Gln-Phe-Glu-Lys- . . . (Strep-tag® II) which bind reversibly but with high affinity to Streptavidin (Strep-Tag® and Strep-tag® II) or to an engineered form of Streptavidin, i.e. "StrepTactin®", (Strep-tag® II).

The term "log D", as used herein, is meant to refer to the logarithm of the distribution-coefficient (D), which is the ratio of concentrations of a compound in a mixture of two immiscible phases at equilibrium. In a preferred embodiment, the term "distribution coefficient" as used herein, is used synonymously with "partition coefficient". In a preferred embodiment, the "distribution coefficient" refers to the ratio of concentrations of a compound in a mixture of water and 1-octanol. Typically, measurement of such distribution coefficient is done by any suitable methodology known to a person skilled in the art. Such suitable methodologies include the "shake-flask method" in which the compound in question is dissolved in a volume of octanol and water and in which then further the concentration of such compound in each solvent is measured. Other suitable methodologies include high-performance liquid chromatography (HPLC). In such HPLC-methodology, the distribution coefficient (D) and its logarithm can be determined by correlating its retention time with similar compounds with known distribution coefficient values.

In accordance with embodiments of the present invention, the capture agent(s) is (are) attached to said porous polymeric scaffold at the surface of said sensor body. In another embodiment, the capture agent(s) is (are) attached to said porous polymeric scaffold within said interstitial pore space. Yet, in another embodiment, the capture agent(s) is (are) attached to said porous polymeric scaffold both at the surface of said sensor body and within said interstitial pore space. Both locations, i.e. at the surface of the sensor body and within the interstitial pore space can be freely adjusted, depending on the intended use of the sensor body in accordance with the present invention.

The present inventors have surprisingly found that the above mentioned limitations of the state of the art technologies can be overcome by employing sensor matrices in accordance with the present invention as defined herein and by using a new assay scheme. For embodiments of this scheme a new kind of sensor body, is employed that comprises or consists of a crosslinked polymer that is responsive to a change of external conditions, e. g. a temperature responsive polymer (such as pNIPAM or similar polymer). Without wishing to be bound by any theory, the present inventors believe that the temperature responsive polymer (or thermoresponsive polymer), e. g. a LCST polymer, when heated in an aqueous environment above a defined temperature (e.g. 32° C. for pNIPAM) undergoes a reversible lower critical solution temperature (LCST) phase transition from a swollen expanded state to a contracted state. Without wishing to be bound by any theory, during this transition the previously swollen polymer scaffold of the sensor body is rendered hydrophobic and loses volume substantially (up to >90%). Most of the aqueous liquid contained within the pores of the microsensor body is expelled. The polymer can be modified in order to accommodate a capture agent (e.g. antibody) on the accessible surface of the micro-sensor body. Once such surface coated sensor body are brought into contact with an analyte-containing solution, the analytes will bind to the capture agent (or "binding member") and thus be immobilized on the sensor body surface. If a labeling agent with affinity to the analyte is also present in or added to the solution it will bind to the bound analyte on the sensor body. If the temperature is increased above the specific LCST the sensor body undergoes a phase transition. This leads to the displacement of the liquid from within the sensor body.

In embodiments, this process can be repeated and as such an efficient exchange of material is achieved. By repeating temperature cycles between temperature levels above and below the LCST, a cyclic liquid exchange is accomplished on the surfaces of the sensor body. This allows for efficient enrichment of analytes and labels from the solution onto the surfaces of the sensor body.

For detection, the sensor body can be simply heated above the LCST once the enrichment process is complete or after any time appropriate for the binding reaction. The signal detected in association with the sensor body will be derived from bound analyte only and will not be compromised by any unbound material as all liquid is expelled from the micro-sensor body. By applying this very fundamental approach a broad variety of assays can be built that may not require any washing steps but which allow to use simple direct labels rather than sophisticated tools usually required for homogenous assays. In another embodiment, the responsive polymer is a UCST thermoresponsive polymer for which the same considerations apply as above, albeit with a reverse direction.

In the following, the basic components involved in such a binding assay are illustrated hereafter exemplarily, e.g. on the basis of a fluorescent sandwich immunoassay:

The invention addresses a number of issues in performing an analyte binding assay by the following exemplary aspects.

I. Signal Intensity

It is desirable to increase the volume of the sensor body for the binding of the analyte with the detectable label which functions as a signal generating means. However if optical means are used for detection, it is very useful to concentrate the signal generating means in a volume as small as possible in order to generate the highest possible signal intensity per unit of volume that a signal is collected from. The sensor body as outlined with capture agents immobilized to their surface, in particular to the exposed surface of the porous polymeric matrix and thus the surface of the interstitial pore space, allows to efficiently augment the signal generated by the bound material.

Figure 3:
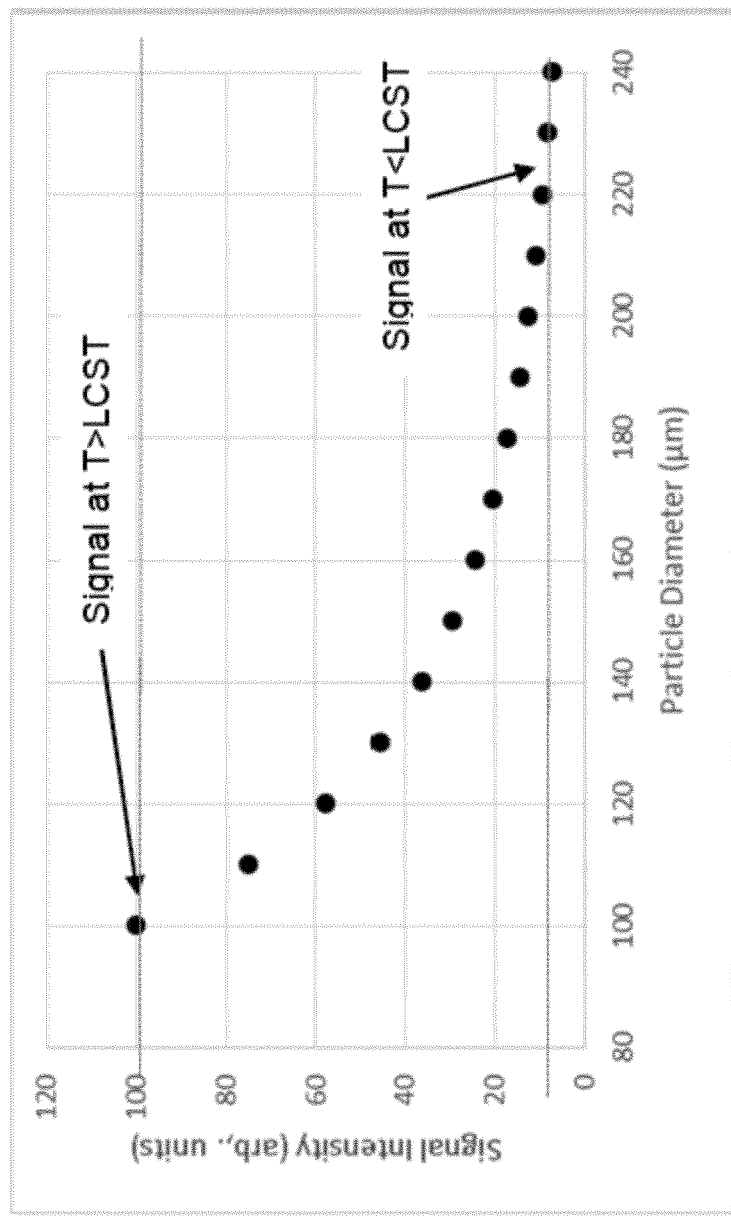

The signal attached to the sensor body is proportional to the number of labels bound to the sensor body divided by the total volume of the sensor element. The smaller the sensor body, the higher the signal. This is shown in FIG. 3.

Figure 4B:
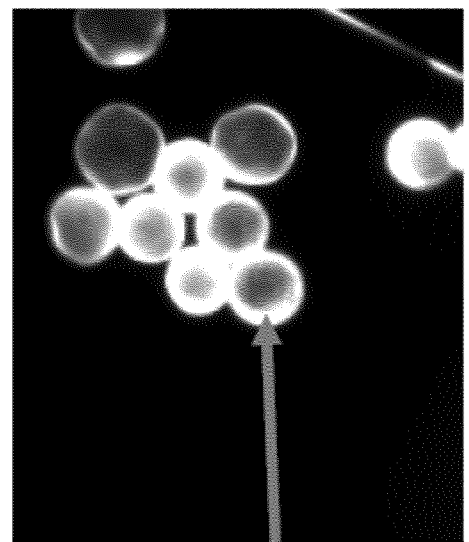
Figure 4A:
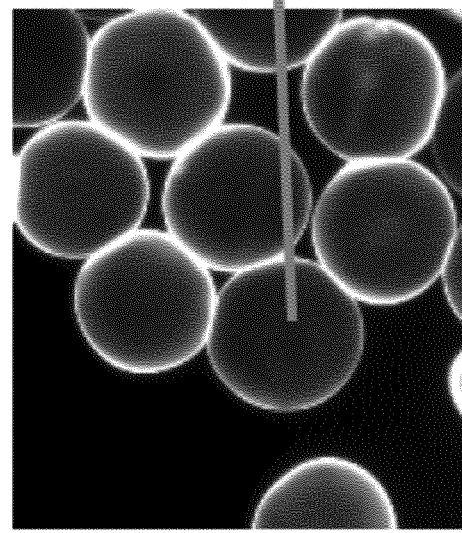

The images of FIGS. 4a and 4b show micro-particles consisting of biotinylated pNIPAM with Phycoerythrin-Streptavidin (PE-SA) conjugate attached at Temperatures below (FIG. 4a) and above (FIG. 4b) the LCST. The binding occurs predominantly at the outer surface of the sensor body as a PE-SA conjugate with a molecular weight in excess of 300 kDa is bigger than the average pore size of the sensor body according to this embodiment. Therefore the signal is concentrated at the outer rim of the sensor body.

II. In-Situ (Homogenous) Washing with Clean Buffer, Efficient De-Masking of Surfaces, Size Exclusion One particular advantage of the approach is offered by the fact that the size distribution of the sensor body pores can be adjusted and thus a defined fraction of the pores does not take up any macromolecules whereas other pores are suitably sized for the uptake of larger molecules. Thus the sensor body takes up liquid essentially purified from macromolecules. By contracting the sensor body the liquid is expelled from within the sensor body and serves as a clean buffer for washing the surface of the larger pores. The size selective uptake can be seen from FIG. 5.

Figure 5B:
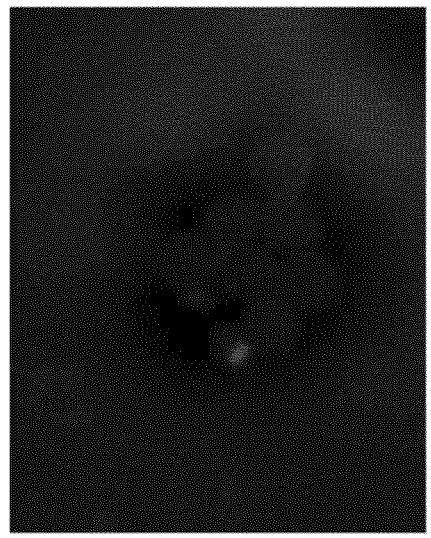
Figure 5A:
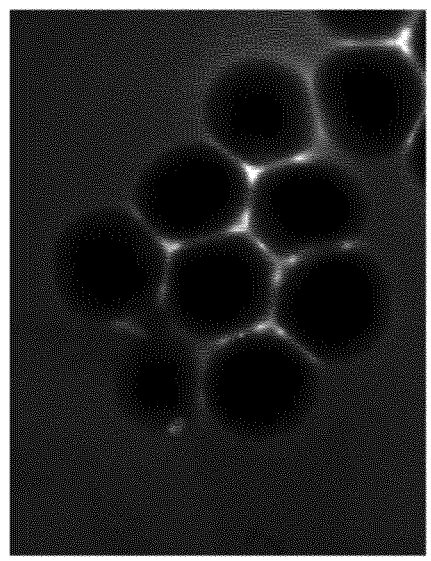

FIG. 5 shows swollen micro-particles against a fluorescent background from phycoerythrin-streptavidin (PE-SA) in phosphate-buffered saline (PBS). The sensor body of the particles has small pores and does not allow the proteins to enter the interior. However buffer is taken up resulting in a local increase of PE-SA in close proximity to the sensor body (FIG. 5a). If the temperature is increased above the LCST the buffer is expelled and thus clean buffer is surrounding the sensor body. This is reflected by the dark halos around the contracted micro-particles in FIG. 5b.

This particular property of embodiments of the sensor body enables to expose the surfaces of the sensor body to a clean liquid without externally exchanging liquid. To the inventors' knowledge this approach has not been described before.

The size exclusion feature results in an increased robustness to masking effects by larger molecular aggregates or cells present in a sample. The porous structure and the interstitial pore space ensures the exclusion of materials that are larger than the analyte. Moreover the liquid expelled from within after each temperature cycle ensures efficient removal of any materials attached to the surface of the sensor body thus making it particularly useful for assays based on samples containing large structures or debris potentially covering any binding areas or capture agents and making them otherwise inaccessible to the analyte.

III. Enrichment by Cyclic Expansion/Contraction

Expansion/Contraction cycles offer the opportunity to increase the material/liquid exchange rate at the sensor body surfaces. This makes it feasible to actively pump liquid through the sensor body and thus to reduce the incubation time necessary for interaction between all of the sample liquid and the sensor body surface. In comparison to conventional sensor matrices used in binding assays the proposed sensor body and assay method thus allow for a reduced incubation time and increased binding efficiency.

Figure 6:
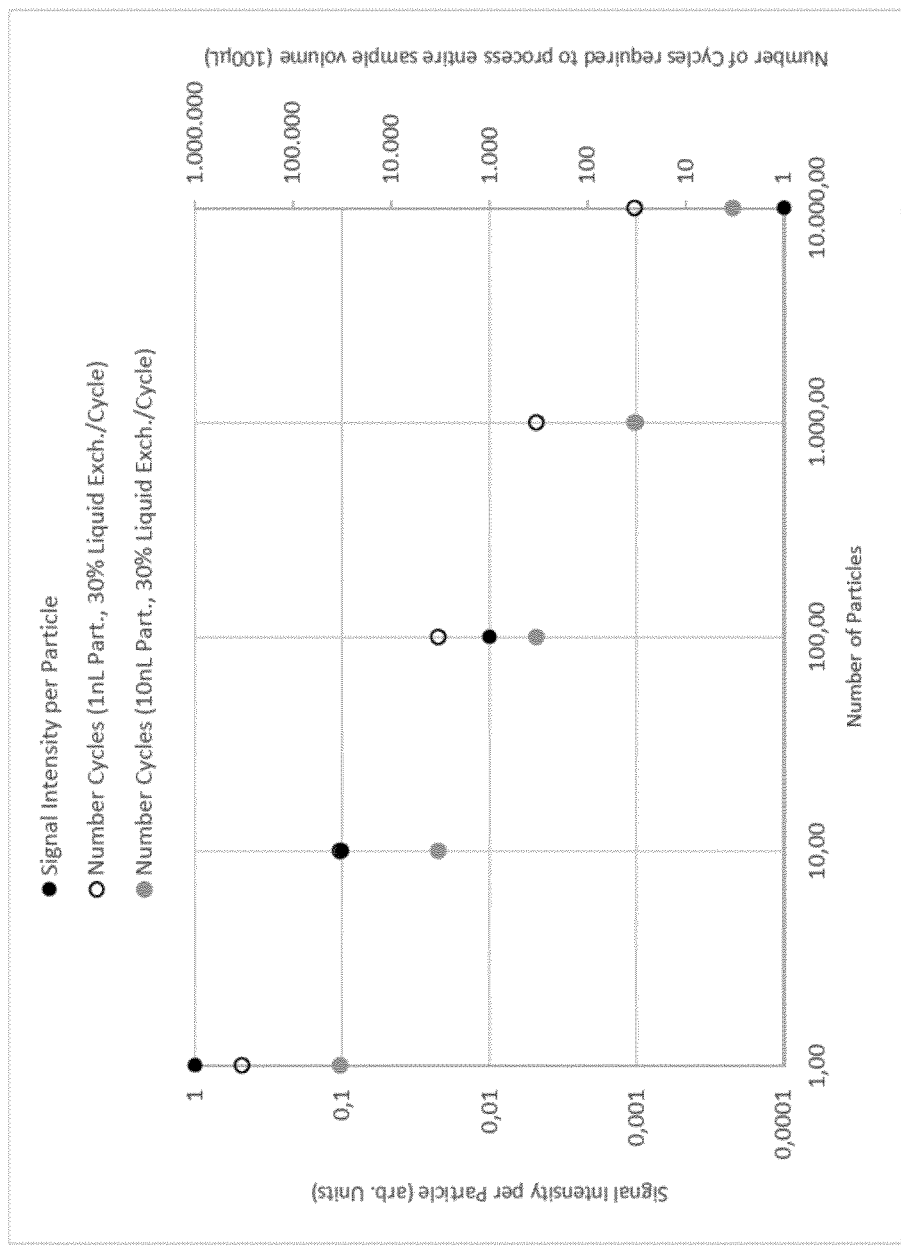

Traditionally the capacity of the sensor body reflected by its surface area/volume and the incubation time defines the ability to capture the analyte from the sample and thus capture efficiency and assay sensitivity. If particles are used the rule is that the more particles are provided the more likely the binding is and the less time will be required in order to achieve the binding. However with the increasing number of particles used in the assay the signal per particle gets reduced. Therefore incubation time and number of particles need to be carefully balanced for each assay and as such represent important parameters for optimization. Gains in capture efficiency do not necessarily lead to improved sensitivity if the signal per sensor body is reduced. The new temperature cycling process facilitates improved liquid exchange and thus increased binding per particle per unit time. This results in reduced incubation times and lower numbers of particles to be used in assays. FIG. 6 illustrates the effect of increasing particles numbers on signal intensity and exemplifies the value of efficient liquid exchange. The data calculated for particles with a mean volume of 1 nL and 10 nL is based on the assumption that for every cycle 30% of new liquid are exposed to the sensor body surface in each particle. The total volume of the sample is set for 100 μL.

The proposed methodology and novel particles allow for using fewer sensor bodies without compromising capture efficiency. Moreover it allows to improve sensitivity by simply performing more temperature cycles.

Furthermore, reference is made to the figures wherein:

FIG. 1 shows an embodiment of a particulate sensor body in accordance with the present invention showing a particle comprising a porous polymeric scaffold with an interstitial pore space within said polymeric scaffold, wherein said porous polymeric scaffold is composed of a thermoresponsive polymer, and wherein one or more capture agents in the form of a capture antibody are attached to said porous polymeric scaffold. Also shown is a detectable label in the form of a fluorophore label attached to a further antibody, the analyte, other antigens in the sample and a solvent.

Figure 2:
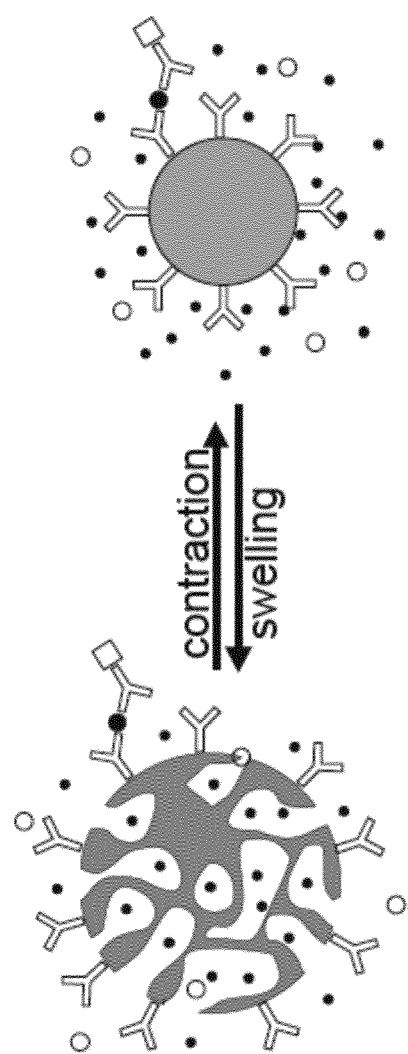

FIG. 2 shows the reversible process of conversion between an expanded, swollen state and a contracted state of the sensor body. Such conversion can be brought about by changing at least one external condition to which said sensor body is exposed, e.g. temperature, pH or salt concentration. In a preferred embodiment, such conversion is brought about by changing the temperature to which said sensor body is exposed.

FIG. 3 shows the dependency of the signal associated with a particulate sensor body (particle) comprising an LCST polymer (e.g. because a labelled analyte has been bound by said sensor body) on the volume of the particle. At a temperature >LCST, the sensor body has a smaller diameter and the signal intensity is greater. At a temperature <LCST, the sensor body has a larger diameter and the signal intensity is smaller.

FIG. 4 shows images of biotinylated pNIPAM particles with phycoerythrin-streptavidin (PE-SA) conjugate attached at temperatures below LCST (FIG. 4a) and above LCST (FIG. 4b) the binding occurs predominantly at the outer surface of the particles of this embodiment since the PE-SA conjugate has a molecular weight in excess of 300 kDa which is bigger than the average pore size of the sensor particles of this embodiment. Therefore in this instance, the detectable signal is concentrated at the outer rim of the particles.

FIG. 5 shows embodiments of swollen particles against a fluorescent background from PE-SA in phosphate buffered saline (PBS). In this embodiment, the particles have small pores and do not allow the proteins to enter the interior. However, buffer is taken up which results in a local increase of PE-SA in close proximity to the particles (FIG. 5a). If the temperature is increased above the LCST, the buffer is expelled and thus clean buffer is surrounding the particles. This is reflected by the dark halos around the particles (FIG. 5b).

FIG. 6 shows the effect of increasing particle numbers on signal intensity (left y-axis). Additionally the graph exemplifies the value of the liquid exchange (right y-axis). The data are calculated for particles with a mean volume of 1 nL and 10 nL and based on the assumption that for every cycle 30% of new liquid are exposed to the particle surface. The total volume of the sample is set to be 100 μL.

Figure 7:
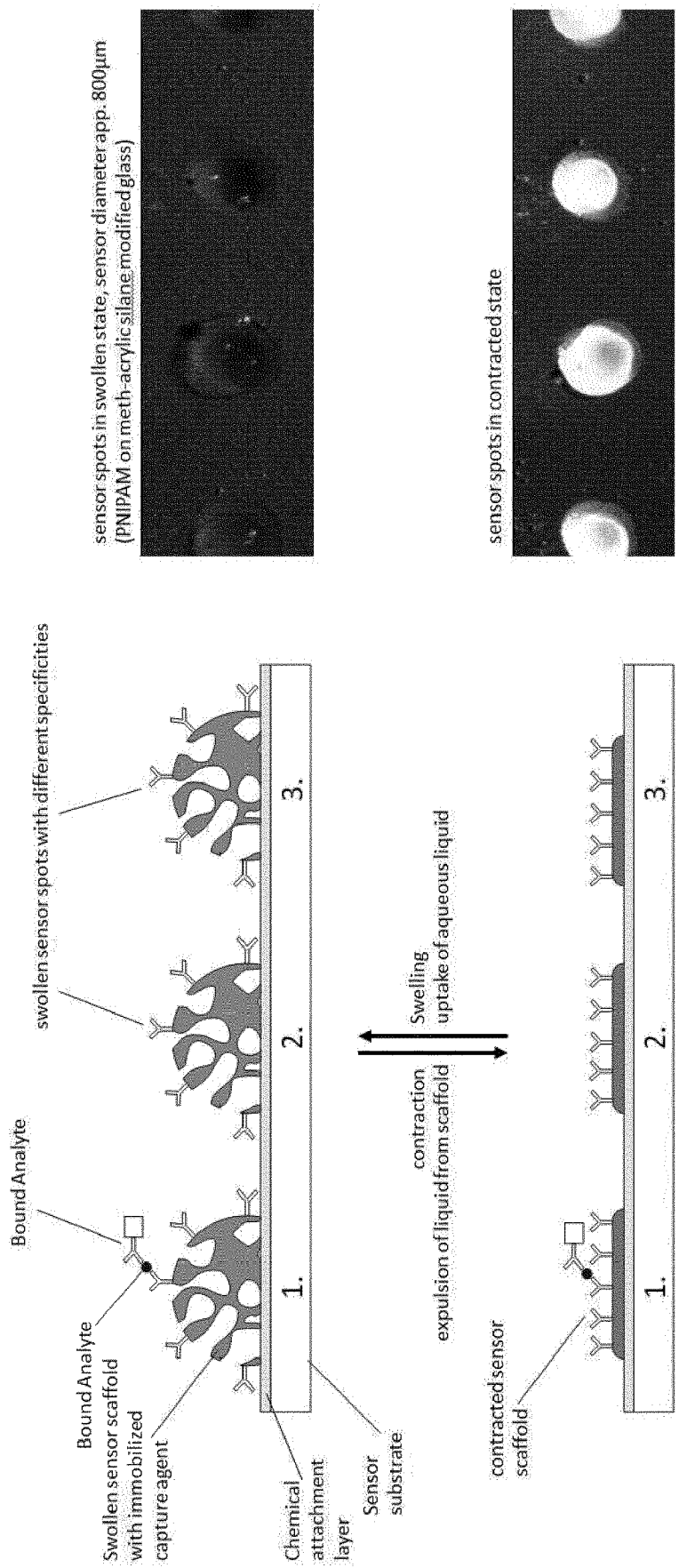

FIG. 7 shows a graphical representation of embodiments of sensor spots, each consisting of a sensor body with different attached binders ("capture agents") (1,2,3). The spots are attached the surface of a substrate. A chemical attachment layer is shown that provides for better attachment and particularly if no other crosslinking agent is used for cross-linking the individual polymer molecules.

The graph illustrates the effect of swelling/contracting. On the right microscope images of such sensor spots are shown in swollen (top) and contracted (state). The white color results from light diffraction by the dense contracted matrix, whereas the swollen matrix appears almost transparent. In a slightly different embodiment, the various spots may be interlinked or connected to each other, thus forming a coating of defined dimensions on a surface of a substrate.

Figure 8:
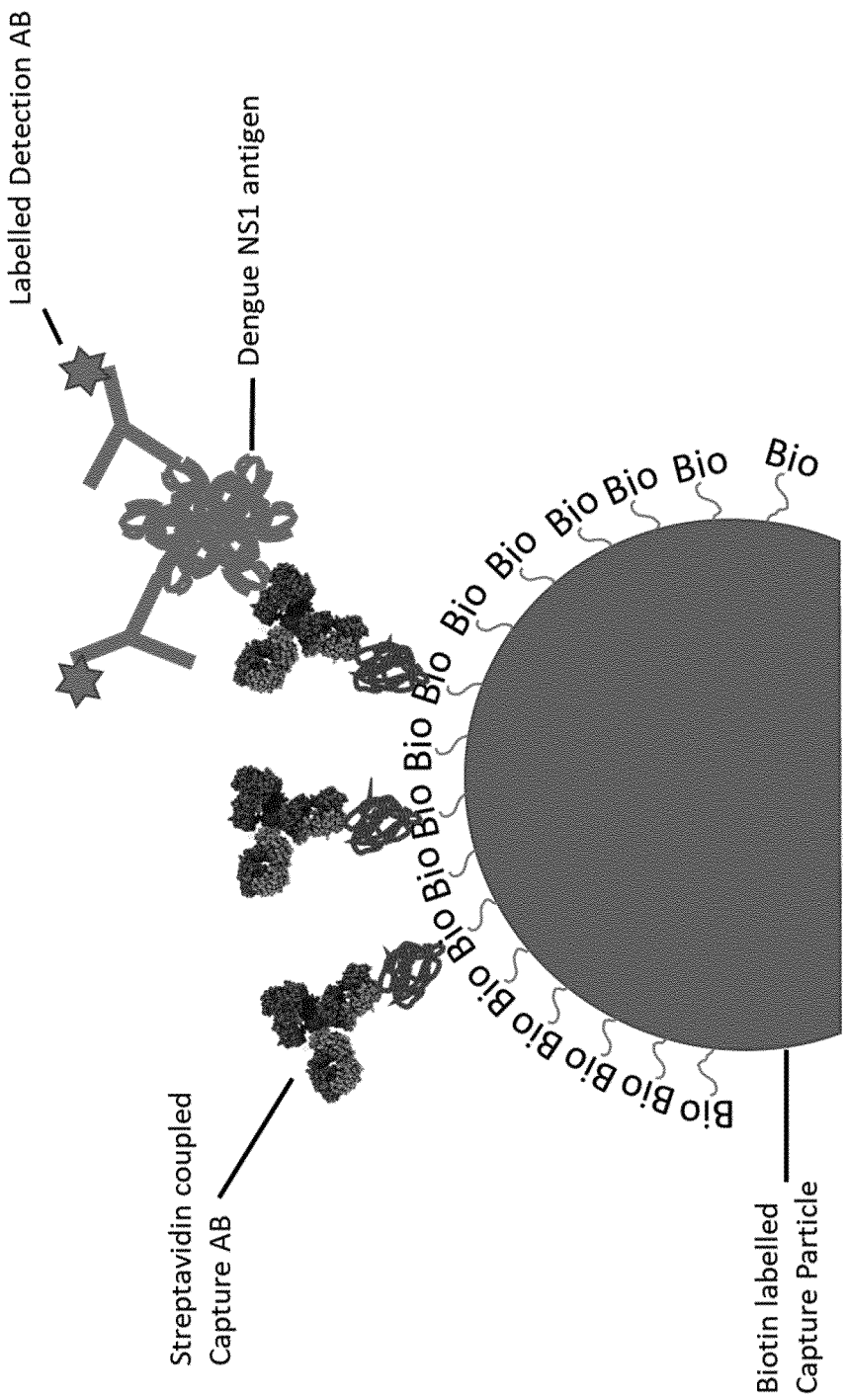

FIG. 8 shows the principle of an assay in accordance with embodiments of the present invention wherein an antigen, e.g. Dengue NS1 antigen, is bound, enriched and detected using sensor bodies according to the present invention e.g. pNIPAM sensor bodies, in an immunoassay format, involving a capture agent e.g. a capture antibody (capture AB) and a labelled detection antibody (detection AB). In this example, the sensor body (also referred to herein and in the figure sometimes as "particle") is labelled with biotin ("Bio") ("Biotin labelled capture particle"), and the capture antibody is coupled with streptavidin ("Streptavidin coupled capture AB") and is attached to the sensor body through the bond between biotin and streptavidin. The sensor bodies are exposed to a sample that has been spiked with the analyte, e.g. Dengue NS1 antigen, and are subjected to cyclic changes (20-50 times, e.g. 40 times) in temperature (using suitable temperature control means, such as a Peltier element controlled by a computer) causing the sensor body to reversibly adopt an expanded and a contracted state. Optionally, the sample may also be mechanically agitated by any suitable means, e.g. a pump, a stirrer, shaking of the entire reaction vessel/container etc. The binding of the analyte and enrichment thereof by the sensor body as well as the detection occur within the same vessel, e.g. a container of the device according to the present invention. Enrichment occurs to such an extent that any washing steps or the transfer to another container is not required. Hence, in accordance with the present invention, the method according to the present invention may be performed in a single vessel and is therefore herein also sometimes referred to as "one-pot-method" or "one-pot-protocol".

Figure 9:
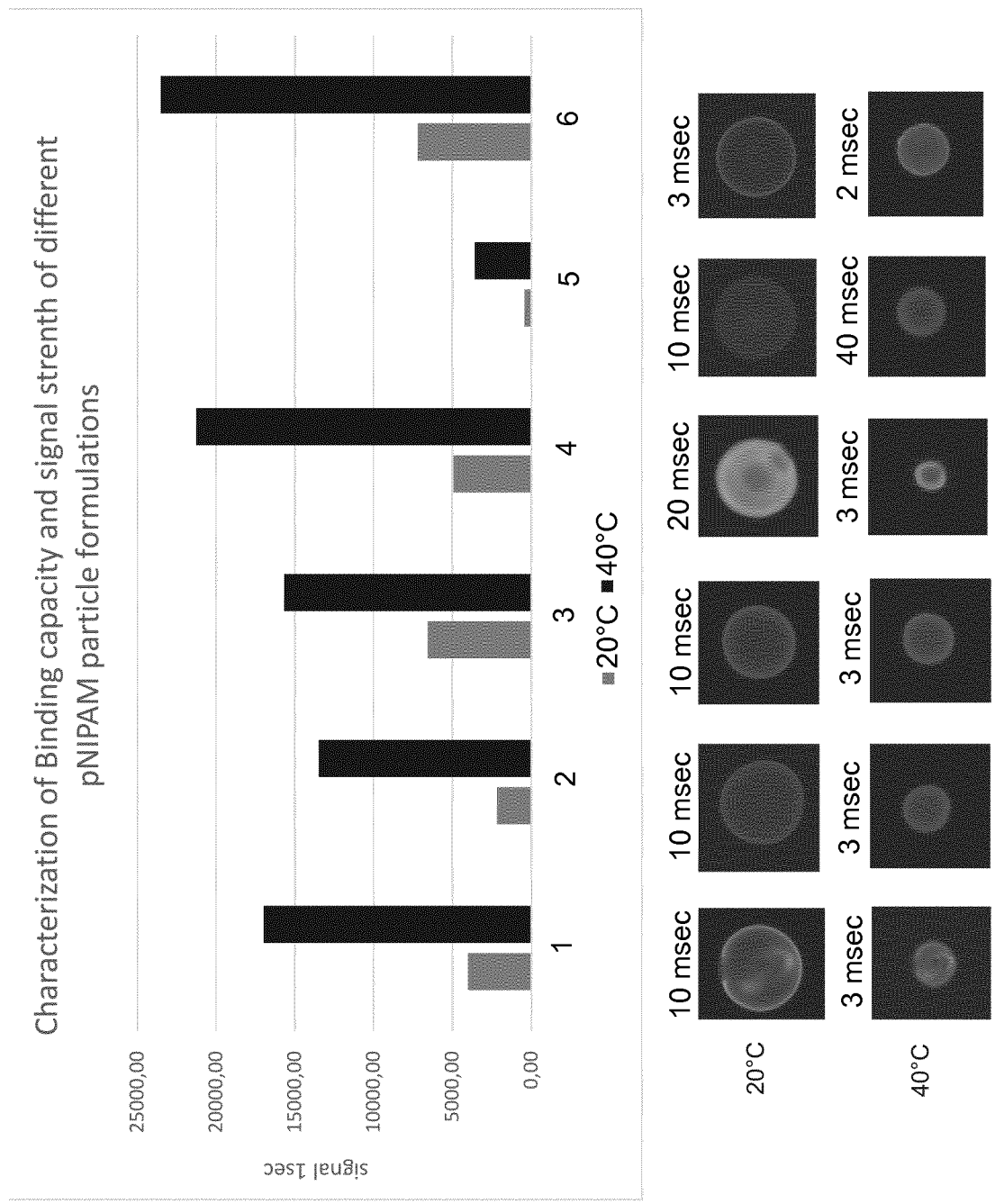

FIG. 9 shows a characterization of the binding capacity and signal intensity of six exemplary different sensor bodies (labelled "1"-"6" underneath the bar chart) according to embodiments of the present invention using pNPAM as polymer of which the porous polymeric scaffold is composed ("pNIPAM particle formulations"). The upper pant of the figure shows the plotted (fluorescence) signal intensity of the respective sensor body 1-6 after binding and enrichment of the analyte (in this case NS1) to the sensor body. For each sensor body 1-6 the signal is shown as a pair of two bars next to each other: namely, when the sensor body is in a contracted state (light gray bar on the right of each pair), i.e. above the LCST of the polymer, and when the sensor body is in an expanded state (dark gray bar on the left of each pair), i.e. below the LCST of the polymer. It is clear that the signal is considerably stronger for the sensor body being in the contracted state. Various particles/sensor bodies were synthesised (with the numbers 1-6 indicated underneath the respective bars in the graph); the particles differed in terms of polymer concentrations, types and concentrations of co-monomers and the degree of cross-linking. More specifically, the particle/sensor body compositions were as follows:

|  | 1 | 2 | 3 | 4 | 5 | 6 |
|---|---|---|---|---|---|---|
| aqueous phase | | | | | | |
| 20% NIPAM | 89 μl | 89 μl | 89 μl | 89 μl | 89 μl | / |
| 15% NIPAM | / | / | / | / | / | 116.4 μl |
| 2% BIS | 3 μl | 3 μl | 3 μl | 3 μl | 3 μl | 3 μl |
| 5% APS | 30.6 μl | 30.6 μl | 30.6 μl | 30.6 μl | 30.6 μl | 30.6 μl |
| Acrylat PEG 5000 Biotin | 40 μl | 40 μl | 40 μl | 50 μl | 50 μl | 50 μl |
| distilled water | 37.4 μl | 37.4 μl | 35.4 μl | 27.4 μl | 27.4 μl | 0 μl |
| TEMED | / | / | 2 μl | / | / | / |
| oil phase | | | | | | |
| Novec | 1188 μl | 1188 μl | 1188 μl | 1188 μl | 1188 μl | / |
| Picosurf | 792 μl | 792 μl | 812 μl | 792 μl | 792 μl | 1980 μl |
| TEMED | 20 μl | 20 μl | / | 20 μl | 20 μl | 20 μl |
| temperature of all reagents | not equilibrated | not equilibrated | not equilibrated | not equilibrated | equilibrated to 28° C. | not equilibrated |
| supernatant after preparation | yes | no | yes | yes | yes | yes |
| pellet after preparation | no | yes | no | no | no | no |

The lower part of the figure shows images of the fluorescent sensor bodies at optimal exposure settings, with the sensor body being shown in an expanded state (upper row) and a contracted state (lower row). The graph in the upper part has been normalised to 1 s exposure time.

Figure 10:
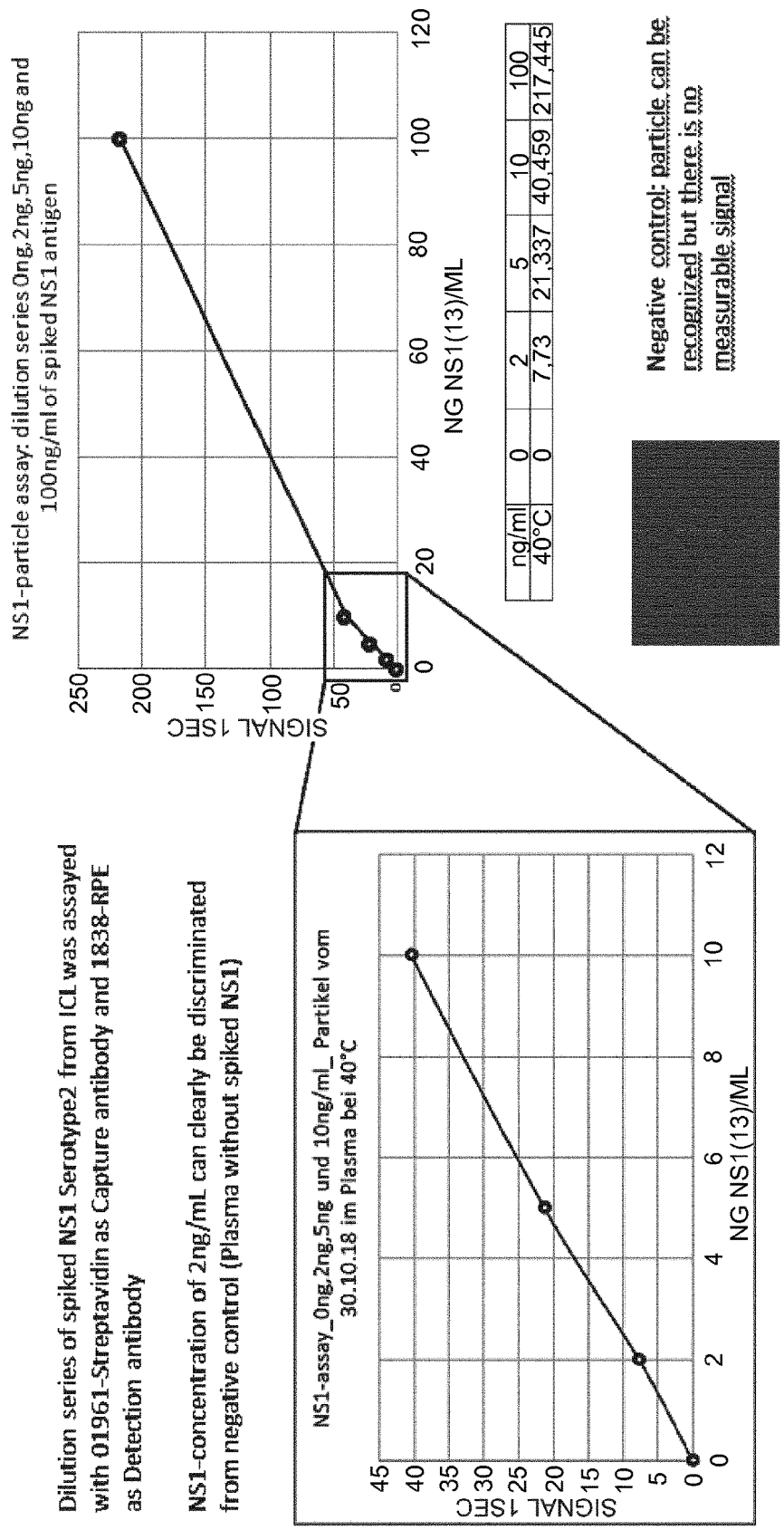

FIG. 10 shows the result of a detection assay in accordance with the principles outlined in FIG. 8. Dilution samples of spiked NS1 Serotype2 from ICL (www.icllab.com/) were assayed using a (biotinylated) sensor body in accordance with the present invention to which an NS1 capture antibody ("01961-Streptavidin", antibody obtained from See worldwide website: meridianbioscience.eu, Streptavidin labelling kit from see worldwide website: expedeon.com/products/protein-antibody-conjugation/lightning-link-antibody-labeling-kits/biotin-streptavidin-labeling-kits/; labeling according to manufacturer's instructions) had been attached, and using a labelled detection antibody ("1838-R-Phycoerythrin", antibody obtained from see worldwide website: meridianbioscience.eu/, R-Phycoerythrin labelling kit from see worldwide website: expedeon.com/products/protein-antibody-conjugation/lightning-link-antibody-labeling-kits/fluorescent-dyes-and-proteins/; labeling according to manufacturer's instructions The sensor bodies were exposed to the dilution samples with defined concentrations of NS1, and temperature cycling was performed for 20-50 times as described for FIG. 8. The assay showed a very good performance without elaborate optimization. Even low concentrations of antigen (2 ng/ml, 5 ng/ml) could be reliably and clearly discriminated from negative control samples. The left hand panel is an enlarged section of the right hand panel of the figure. Also shown is a negative control (plasma without antigen) where the sensor body can be just about discerned but no significant fluorescence signal can be detected.

Furthermore, reference is made to the following examples which are given to illustrate not to limit the present invention.

EXAMPLES

Example 1: Synthesis of Detection-Particles

Generation of Sensor Body Polymerisation Mixes

| Component 1 (Aqueous phase):<br>Components per mL Polymerisation mix | | |
|---|---|---|
|  | Mix 1 | Mix 2 |
| 20% (w/v) N-Isopropylacrylamide (NIPAM) | 500 μl | 250 μl |
| 2,5% (w/v) N,N'-Methylenebisacrylamide | 40 μl | 20 μl |
| 5% (w/v) Ammonium persulfate | 150 μl | 150 μl |
| Deionised water | 310 μl | 580 μl |

| Component 2 (Oil phase): | |
|---|---|
| Pico-Surf (TM) 1, 10 ml, 2% in Novec 7500 | 1485 μl |
| N,N,N',N'-Tetramethylethylenediamine | 15 μl |

The mixes were separately evacuated and purged with argon in 4 evacuation-purge cycles, each. Afterwards, the mixes were pipetted under argon atmosphere into the respective wells of a BioRad droplet generator chip DG8. 60 μl of the oil phase were given to each oil phase reservoir and 25 μl of the aqeous phase to each aqueous phase reservoir.

Then, the BioRad protocol for droplet generation (QX200™ Droplet Generator Instruction manual 10031907 RevC) was followed. Alternatively, the chip could be operated manually. For that purpose, a 50 mL syringe need to be connected by a tubing and a suitable adapter to the droplet reservoir of the droplet generator chip. Before connecting, the plunger is set to the 30 mL position. After filling in the aqueous and oil phase, the plunger is manually drawn to the 50 mL position to apply a defined pressure to the system. Just before the oil phase or aqueous phase reservoir runs empty, the pressure is released.

The droplet reservoirs were covered with adhesive tape. The droplets were allowed to polymerise for 60 min at room temperature. Use of mix 1 delivers particles consisting of a crosslinked ~10% pNIPAM gel. Mix 2 delivers particles consisting of a crosslinked ~5% pNIPAM gel. The latter exhibit a larger pore width compared to the former. The percentage of the gel and the crosslinking can be varied.

If particles of larger size are needed, aliquots of the polymerization mixes can be pipetted or dispensed by a suitable dispenser tool into the oil phase. There is a wide variety of manual or automated dispenser tools commercially available. Depending on the tool used the particle size can be varied over a wide range. A multiplicity of droplets of the polymerisation mix can be dispensed in one oil volume as well as a single droplet per oil volume. Combination of an automated dispenser tool with an automated x/y stage and a multi well oil reservoir as for example a microtiterplate allows the creation of a large number of particles in short time.

Recovery of the Particles and Transfer to the Aqueous Phase

After the polymerisation process is finished as much as possible of the oil phase is gently withdrawn from the droplet reservoir using a pipette paying attention not to remove the pNIPAM particles. Then, 50 µl 1% (v/v) TRITON™ X-100 in water are pipetted to the particles. The volume is mixed by pipetting up and down such that the particles do not stick to the walls of the droplet chip. The volume is transferred to an Eppendorf Tube and the process is repeated once again. The transfer process can be monitored under a binocular microscope to prevent a major loss of particles in this step.

The tubes are then centrifuged at 2000 g for 1 min. Oil phase (bottom) and aqueous phase (top) are now well separated with an interphase containing the particles. 200 µl of a density gradient medium (Optiprep, Axis shield) is now pipetted slowly to the tube. It is important to prevent excessive mixing of the aqueous phase with the density gradient medium. Ideally, most of the density gradient medium slips under the particles phase. The tubes are centrifuged for 2 min at 2000 g. Afterwards, the density gradient medium phase is situated between the oil phase and the particle phase. The particle phase can now be transferred to a new tube. In this step care need to be taken not to transfer any of the oil volume and as small of a volume as possible of the density gradient medium to the new tube.

1 mL of PBS, 0.1% (v/v) TRITON™ X-100 is added to the tube containing the particles. The volume is mixed and centrifuged at 2000 g for 2 min. The particles are now pelleted to the bottom of the tube. The supernatant is removed leaving the particles in the tube. 1 mL of PBS, 0.1% (v/v) TRITON™ X-100 is added to the tube again and the process of washing is repeated 5 times. Finally, the particles are taken up in a volume of a buffer that is suitable for the following processes. This, for example, could be 1001 of PBS, 0.1% (v/v) TRITON™ X-100.

Observation of the Lower Critical Solution Temperature Behaviour of the Sensor Body 25 µl of a diluted suspension of the particles is transferred into a Leja 100 µm chamber slide (leja.nl). The slide is placed on a PELTIER element 30×30×4.7 mm, 19.3W (Quick-Ohm, Küpper & Co. GmbH, #QC-71-1.4-3.7M) capable of fast temperature cycling in direct contact with the heating/cooling element. The whole setup is placed under a binocular microscope with dark field illumination. When the temperature of the system is set below 32° C., the sensor body is transparent and mostly invisible. At temperatures of 32° C. or higher the sensor body turns opaque: the particles turn white and shrink. By setting the temperature below 32° C. again, the particles swell and turn transparent again. The process is reversible and can be repeated many times in fast cycles. Given a sufficient heating and cooling rate of the Peltier element and a sufficient thermal conductivity of the whole system, cycle times (heating, shrinking; cooling, swelling) of less than 20 seconds can be achieved.

Generation of Polymerisation Mixes for Biotin-Modified pNIPAM Particles

| Component 1 (Aqueous phase): Creation of Biotin-modified Monomer-Mix: A Biotin-modified acrylic monomer was created in a separated reaction. The reaction mix consisted of Acrylic acid N-Hydroxysuccinimide ester (an activated aminoreactive Acrylic acid monomer) and Biotin-dPEG7-NH2 (A Biotin-derivative modified with a PEG7 spacer arm terminated with an amino group) | |
|---|---|
| | ~2.5% Biotin-modified monomer mix |
| PBS to a total Volumen of (mL) | 0.114 |
| Acrylic acid N-Hydroxysuccinimide ester (mg) | 2.8 |
| Biotin-dPEG7-NH2 (mg) | 10.0 |

The reaction mix was incubated for 30 minutes at 25° C. This mix was used without any further purification in pNIPAM polymerisation reactions.

| Components per mL Polymerisation mix | | |
|---|---|---|
| | Mix 3 | Mix 4 |
| 20% (w/v) N-Isopropylacrylamide (NIPAM) | 500 µl | 250 µl |
| 2.5% (w/v) N,N'-Methylenebisacrylamide | 40 µl | 20 µl |
| ~2.5% Biotin-modified monomer mix | 20 µl | 10 µl |
| 5% (w/v) Ammonium persulfate | 150 µl | 150 µl |
| Deionised water | 310 µl | 570 µl |

| Component 2 (Oil phase): | |
|---|---|
| Pico-Surf (TM) 1, 10 ml, 2% in Novec 7500 | 1485 µl |
| N,N,N',N'-Tetramethylethylenediamine | 15 µl |

The mixes were separately evacuated and purged with argon in 4 evacuation-purge cycles, each. Afterwards, the mixes were pipetted under argon atmosphere into the respective wells of a BioRad droplet generator chip DG8. 60 µl of the oil phase were given to each oil phase reservoir and 25 µl of the aqeous phase to each aqueous phase reservoir.

Then, the BioRad protocol for droplet generation (QX200™ Droplet Generator Instruction manual 10031907 RevC) was followed. Alternatively, the chip could be operated manually. For that purpose, a 50 mL syringe need to be connected by a tubing and a suitable adapter to the droplet reservoir of the droplet generator chip. Before connecting, the plunger is set to the 30 mL position. After filling in the aqueous and oil phase, the plunger is manually drawn to the 50 mL position to apply a defined pressure to the system. Just before the oil phase ore aqueous phase reservoir runs empty, the pressure is released.

The droplet reservoirs were covered with adhesive tape. The droplets were allowed to polymerise for 60 min at room temperature. Use of mix 1 delivers Biotin-modified particles ("sensor bodies") consisting of a crosslinked ~10% pNI- PAM gel. Mix 2 delivers Biotin-modified particles ("sensor bodies") consisting of a crosslinked ~5% pNIPAM gel. The latter exhibit a larger pore width compared to the former. The percentage of the Gel and the crosslinking can be varied.

Recovery of the Particles and Transfer to the Aqueous Phase

After the polymerisation process is finished as much as possible of the oil phase is gently withdrawn from the droplet reservoir using a pipette paying attention not to remove the pNIPAM particles. Then, 50 µl 1% (v/v) TRITON™ X-100 in water are pipetted to the particles. The volume is mixed by pipetting up and down such that the particles do not stick to the walls of the droplet chip. The volume is transferred to an Eppendorf Tube and the process is repeated once again. The transfer process can be monitored under a binocular microscope to prevent a major loss of particles in this step.

The tubes are then centrifuged at 2000 g for 1 min. Oil phase (bottom) and aqueous phase (top) are now well separated with an interphase containing the particles. 200 µl of a density gradient medium (Optiprep, Axis shield) is now pipetted slowly to the tube. It is important to prevent excessive mixing of the aqueous phase with the density gradient medium. Ideally, most of the density gradient medium slips under the particle phase. The tubes are centrifuged for 2 min at 2000 g. Afterwards, the density gradient medium phase is situated between the oil phase and the particle phase. The particle phase can now be transferred to a new tube. In this step care need to be taken not to transfer any of the oil volume and as small of a volume as possible of the density gradient medium to the new tube.

1 mL of PBS, 0.1% (v/v) TRITON™ X-100 is added to the tube containing the particles. The volume is mixed and centrifuged at 2000 g for 2 min. The particles are now pelleted to the bottom of the tube. The supernatant is removed leaving the particles in the tube. 1 mL of PBS, 0.1% (v/v) TRITON™ X-100 is added to the tube again and the process of washing is repeated 5 times. Finally, the particles are taken up in a volume of a buffer that is suitable for the following processes. This, for example, could be 100 µl of PBS, 0.1% (v/v) TRITON™ X-100.

Observation of the Lower Critical Solution Temperature Behaviour of the Particles 25 µl of a diluted suspension of the Biotin-modified particles is transferred into a Leja 100 µm chamber slide (leja.nl). The slide is placed on a PELTIER element 30×30× 4.7 mm, 19.3W (Quick-Ohm, Küpper & Co. GmbH, #QC-71-1.4-3.7M) capable of fast temperature cycling in direct contact with the heating/cooling element. The whole setup is placed under a binocular microscope with dark field illumination. When the temperature of the system is set below 32° C., the particles are transparent and mostly invisible. At temperatures of 32° C. or higher the particles become visible: They turn opaque and shrink. By setting the temperature below 32° C. again, the sensor body swells and the particles turn transparent again. The process is reversible and can be repeated many times in fast cycles. Given a sufficient heating and cooling rate of the Peltier element and a sufficient thermal conductivity of the whole system, cycle times (heating, swelling, cooling, shrinking) of less than 20 seconds can be achieved. The inventors conclude that the Biotin-Modification of the Polymer does not impair the LCST behaviour of the pNIPAM sensor body.

In control experiments, particles were synthesized with similar reaction mixes as described above were the 2.5% Biotin-modified monomer mix was replaced by a 2.5% acrylic acid solution. The particles formed with such mixes almost completely lost their LCST characteristic.

Specific Binding of a Streptavidin-Phycoerythrin Conjugate to Biotin-Modified pNIPAM Particle In order to assess whether the Biotin-modified pNIPAM particles are capable of binding Streptavidin specifically, the particles created with mixes 3 and 4 were incubated with a solution of a Streptavidin-Phycoerythrin conjugate. Particles created with mixes 1 and 2 (without Biotin-modification) were incubated with the same solution as negative control.

| Incubation mixes: | |
|---|---|
| pNIPAM particles of Mix 1, 2, 3 or 4 (n) | ~100-200 |
| PBS, 0.1% TRITON ™ X-100 | 45 µl |
| Streptavidin-Phycoerythrin conjugate (1ug/mL) | 5 µl |

The incubation mixes were combined and mixed briefly. 25 µl of each mix is transferred into a Leja 100 µm chamber slide (leja.nl) and placed on a peltier element as described above. The setup is placed on a fluorescence microscope (Axio-Observer, Zeiss, Germany) equipped with a 550 nm LED light source (CooLED pE-4000), a Cy3 HC Filterset (Semrock) and a 10×Zeiss objective. The Peltier temperature is set to 20° C. (temperature below LCST of the sensor body) and the appearance of the sensor body was observed. The biotin-modified sensor body (created in polymerisation mix 3 and 4) could be detected over the background by a ring-shaped fluorescence signal that mainly is situated at the outer shell of the particle. The sensor body without Biotin modification (created in polymerisation mix 1 and 2) do not show any fluorescence signal. When the Peltier temperature is set to 40° C. (temperature above LCST) the particles shrink. The Biotin-modified particles show a strongly enhanced fluorescence signal at their surface whereas the non-modified particles remain dark.

The Incubation mixes in the Leja slides were subjected to 25 temperature cycles of incubation for 10 sec 20° C. followed by 10 see at 40° C. After these cycles the fluorescence signals of the particles with Biotin-modification was strongly enhanced compared to signals observed before temperature cycling. The particles without Biotin modification remained dark. A remarkable difference is observed concerning the distribution of the fluorescence signal at the Biotin-modified particles of mixes 3 and 4. Particles created with mix 3 exhibit a bright signal on the surface of the particles but only a week signal in the particle volume which could be interpreted as preferred binding of the Streptavidin-Phycoerythrin at the outer surface of the particle. These particles are created with a reaction mix containing 10% NIPAM monomer. Particles created with mix 4 (containing 5% NIPAM monomer) exhibit the signal maximum in the centre of the particle, which could be interpreted as homogeneous binding of the Streptavidin-Phycoerythrin over the whole particle volume. For both types of particles the fluorescence signal is much higher when the particle is monitored at 40° C. (temperature above LCST) compared to 20° C. (Temperature below LCST).

Particles created with mix 1 (10% NIPAM monomer, no Biotin modification) do not bind the Streptavidin-Phycoerythrin conjugate but create a fluorescence pattern with dye in solution: When the particles are cooled to a temperature below LCST (20° C.) they swell and fill with water. The particles remain dark but a halo brighter than the incubation mix forms at the border of the particle. This could be interpreted as an enrichment of the dye at border of the particle due to a narrow pore width that prevents the large dye protein from entering the particle volume. This effect can be used in assays to enrich and concentrate the analyte (and other large molecules) in a homogenous process.

When the temperature is raised to 40° C. (above LCST) the particles shrink. The halo is displaced as bright fluorescent clouds from the surface of the particle. This could be interpreted as a wash effect of the non-fluorescent solvent that is ejected from the inside of the particle and washes away unbound material from the particle surface. The latter effect can be used in assays to wash away non-specifically bound material without the need of adding an external washing solution.

Example 2: Establishing a Fluorescence Based Immunoassay Using a Freely Diffusible/Free-Floating Particle as a Sensor Body Here the present inventors describe the process of establishing a fluorescence based immunoassay for the detection of human cardiac troponin I (cTnI). The assay employs a detection antibody labelled with a fluorescent dye. The capture antibody is labelled with Streptavidin and coated to Biotin modified pNIPAM particle. A Sandwich complex of the particle bound capture antibody the antigen and the fluorescent detection antibody is formed in a process that employs temperature cycling to pump the analyte towards the particle surface and any unbound material away from the particle surface. Unbound detection antibody, and thus the fluorescent label, is removed by appropriate washing steps which may apply the non-fluorescent solution trapped inside the pNIPAM particles. After washing, the particle associated fluorescent signal is detected.

Detection Antibodies

The cTnI detection antibody (clone 10C9, SDIX) is labelled using the Lightning-Link® R-Phycoerythrin antibody labelling kit (Innova Bioscience) according to the manufacturer's protocol and then purified. Alternatively, fluorescence labelled Antibody can be acquired from different vendors.

Capture Antibody:

Clone TPC-110 (SDIX) is used as a capture antibody. This was labelled by Lightning link Streptavidin (Innova Bioscience) according to the manufacturer's protocol.

Preparation and Recovery of pNIPAM Detection Particles

Preparation of Biotin-modified pNIPAM detection particles was carried out according to the methods described in embodiment 1 with the following modification. After transferring the biotin-labelled pNIPAM particles into the aqueous phase and eliminating unsuitable particle sizes in the exemplary embodiment, the particles are coated with the Streptavidin-labeled capture antibody.

Coating of pNIPAM Detection Particles with Streptavidin Labelled Capture Antibody Coating of the pNIPAM with Streptavidin labelled capture antibody is accomplished in PBS, 0.1% TRITON™ X-100. The concentration of the Streptavidin labelled capture antibody is selected such no accessible biotin remains on the surface (outer or inner and outer surface, depending on the pore width of the polymer) of the pNIPAM particles. Optimal capture antibody concentration has been determined in preliminary tests with labelled Streptavidin by determining a plateau surface coverage. The coupling is done in an Eppendorf Thermoshaker with agitation of the solution at 350 rpm for 30 min and 5 temperature oscillations between 25° C. and 37° C. After coupling with the capture antibody the particles are washed several times by pelleting and exchanging the supernatant as described above. Subsequently, the concentration of the pNIPAM-particles is determined by counting under a microscope in a counting chamber.

Determination of the Suitable Concentration of the Detection Antibody and Creation of a Calibration Curve:

| Reaction mix: | |
|---|---|
| cTNI depleted human EDTA-plasma + x µl cTNI spike | 6 µl |
| 500 mM Phosphate buffer pH7.5, 1M NaCL, 0.25% TRITON ™ X-100 | 2 µl |
| HBR-Plus (Scantibodies) | 1 µl |
| R-Phycoerythrin labeled detection antibody | y µl |
| pNIPAM detetction particles coated with capture antibody | z µl |
| Total volume | 10 µl |

To determine the suitable concentration of the detection antibody and to assess the detection limit and the dynamic range, a number of series of such reaction mixes need to be set up. Each series consists of reactions with different final cTNI concentrations. Typically, the cTNI concentrations in the reactions within each series vary from single digit pg/mL up to two digit ng/mL final concentrations of cTNI and negative probes without cTNI. The series differ in the concentration of the R-Phycoerythrin labeled detection antibody and/or in the size and number of pNIPAM detection particles coated with capture antibody.

The reaction mixes are filled into a reaction vessel. This could be a capillary with a structure on one side with dimensions suitable to hold back the particles when a liquid flows through. This structure can be a sieve structure (like POREX), a step or the like. The capillary could also be a flexible tubing the dimension and form of which can be modified by pressing an external form against it. This also allows to integrate valve functionalities.

The reaction vessel is placed on a PELTIER element in direct contact with the heating/cooling element. In this sample the PELTIER was a 30×30×4.7 mm, 19.3W (Quick-Ohm, Küpper & Co. GmbH, #QC-71-1.4-3.7M) capable of fast temperature cycling. The sample was subjected to a Temperature cycle protocol with the following parameters:

Temperature 1: 37° C. for 10 seconds
Temperature 2: 25° C. for 10 seconds
25 cycles.

The Temperature is then set to 20° C. and the vessel is washed with 50 µl wash buffer (50 mM Phosphate buffer pH7.5, 100 mM NaCL, 0.05% TRITON™ X-100). The particles are held back in the vessel.

Afterwards, the temperature cycle protocol is applied once again for 10 cycles. Optionally, the temperature is set to 20° C. again and the wash process is repeated.

For detection, the temperature is set to 37° C. This leads to shrinking of the pNIPAM detection particles and the enhancement of the fluorescence contrast. A digital image is taken of all particles. The fluorescence signal of each particle is measured and corrected for the local background. For a calibration curve, the median of all particle signals of each reaction mix of one series is plotted versus the cTNI concentration of the sample.

Optimum concentration of the labeled detection antibody and optimum number and size of pNIPAM detection particles is indicated by the lowest limit of detection and broadest dynamic measurement range.

Measuring the cTNI Concentration of Unknown Samples:

For each patient sample, a reaction mix is set up as follows:

| Reaction mix: | |
|---|---|
| Human patient EDTA-plasma | 6 µl |
| 500 mM Phosphate buffer pH7.5, 1M NaCL, 0.25% TRITON ™ X-100 | 2 µl |
| HBR-Plus (Scantibodies) | 1 µl |
| R-Phycoerythrin labelled detection antibody | x µl |
| pNIPAM detetction particles coated with capture antibody | z µl |
| Total volume | 10 µl |

The amount of R-Phycoerythrin labelled detection antibody (x) and amount and size of the pNIPAM detection sensor body coated with capture antibody (z) corresponds to the optimum values determined before. The sample is incubated, subjected to temperature cycles, washed, as described above. The signal is measured by imaging as described above. Absolute cTNI values can be calculated based on a calibration curve created separately or based on spiked cTNI sample(s) and negative control(s) assayed in parallel to the patient sample.

Example 3: Establishing a Fluorescence Based Immunoassay Using a Surface Immobilised Spot as Sensor Body Here the present inventors describe the process of establishing a fluorescence based immunoassay for the detection of human cTnI using a sensor body fixed to a flat surface of a substrate (i.e. a sensor "spot"). The assay employs a detection antibody labelled with a fluorescent dye. The capture antibody is labelled with Streptavidin and coated to Biotin modified pNIPAM sensor matrix fixed on the solid surface. A Sandwich complex of the sensor matrix bound capture antibody the antigen and the fluorescent detection antibody is formed in a process that employs temperature cycling to pump the analyte towards the sensor matrix surface and any unbound material away from the sensor matrix surface. Unbound detection antibody, and thus the fluorescent label, is removed by appropriate washing steps which may apply the non-fluorescent solution trapped inside the pNIPAM sensor matrix. After washing, the matrix associated fluorescent signal is detected.

Detection Antibodies

The cTnI detection antibody (clone 10C9, SDIX) is labelled using the Lightning-Link® R-Phycoerythrin antibody labelling kit (Innova Bioscience) according to the manufacturer's protocol and then purified.

Capture Antibody:

Clone TPC-110 (SDIX) is used as a capture antibody. This was labelled using a Lightning link Streptavidin labelling kit (Innova Bioscience) according to the manufacturer's protocol.

Preparation of Surface Fixed pNIPAM Sensor Matrix Spots

Preparation of the Surface Substrate:

Borofloat glass microscopic slides were used as substrate for fixing the sensor matrix spots.

To allow for a tight fixation of the sensor matrix to the surface the surface was modified with PlusOne Bind-Silane (GE lifesciences) according to the manufacturer's protocol.

Preparation of the Polymerization Mixes:

| Mix 1, aqueous phase: | |
|---|---|
| Component | µl |
| 20% (w/v) N-Isopropylacrylamide (NIPAM) | 500 |
| 2.5% BIS (w/v) N,N'-Methylenebisacrylamide | 40 |
| ~2,5% Biotin-modified monomer mix | 40 |
| 5% (w/v) Ammonium persulfate | 150 |
| Water | 270 |

The mixes were separately evacuated and purged with argon in 4 evacuation-purge cycles, each. Afterwards, the mixes were kept in closed vials until use.

Spotting of Mix 1 to the Modified Glass Surface

A piezo-electrical print head for fluids in the viscosity range of 0.4-10000 mPas and a nozzle diameter of 90 µm were used (MD-K-140-020) on a Microdrop/autodrop system (Microdrop Technologies) to produce 180-380 pL spots. Substrates used included COC, Polycarbonate, glass slides.

Freshly prepared NIPAM solutions were filtered through a Whatman® ReZist® syringe filter (30 mm, pore size 5 µm, PTFE) into a ND13 screw neck vial using a syringe. The heater and dispenser unit of the microdrop/autodrop system were switched on and the system was cleaned by flushing it with filtered dH2O (or Isopropanol). The nozzle temperature was adjusted to 23° C. and started filling the dispenser head three times for 5 s to prime the system. The nozzle was wiped with 70% ethanol or isopropanol to remove larger drops. Dispensing parameters were as follows: Piezo driver voltage was in the range of 70-120 and the pulse length between 30-50ps. For the microdrop system, arrays were generated using a Steinmeyer XYZ-stage that had been installed below the dispenser head. Droplets were spotted at a frequency of 5/s onto the substrate either in a burst or continuous mode ("on the fly"). To prevent drying of the spots, substrates were cooled around the cloud point using a Quick-Ohm PELTIER element (30×30×4.7 mm, 19.3W, Küpper & Co. GmbH).

Polymerization and Slide Washing

After spotting, an adhesive slide incubation chamber (BioRad) is attached to the slide. The chamber is the floated with polymerization mix 2 (oil Phase) and incubated for 60 min.

After the polymerization process is finished the oil phase is removed from the chamber and the adhesive lid is removed. Afterwards the slide is placed in a 50 mL Falcon tube filled with PBS 1% TRITON™ X-100. The tube is gently agitated to remove most of the oil phase from the surface of the slide and the briefly spun at 50 g to allow the oil phase to settle at the bottom of the tube. The slide is passed to another tube filled with warm (40° C.) PBS 0.1% TRITON™ and incubated for 1 min. Afterwards the slide is passed to a fresh tube containing cold PBS 0.1% TRITON™ (15° C.) and incubated for two minutes. The transfer from warm to cold PBS 0.1% TRITON™ is repeated for another 5 times. Finally, the slide is washed two times with water and dried.

Coating of Surface Attached pNIPAM Sensor Matrix with Streptavidin Labelled Capture Antibody Coating of the pNIPAM with Streptavidin labelled capture antibody is accomplished in phosphate buffered saline (PBS), 0.1% TRITON™ X-100. The concentration of the Streptavidin labelled capture antibody is selected such no accessible biotin remains on the surface (outer or inner and outer surface, depending on the pore width of the polymer) of the pNIPAM sensor matrix spots. Optimal capture antibody concentration has been determined in preliminary tests with labelled Streptavidin by determining a plateau surface coverage. For the coupling process, the slide is covered with an adhesive incubation chamber as used in the polymerization process. The chamber is filled with the Streptavidin labelled antibody solution and incubated on an Eppendorf Thermoshaker in a microtiter plate adapter with 5 temperature oscillations between 25° C. and 37° C. After coupling with the capture antibody the sensor matrix spots are washed 5 times at 40° C. and 15° C. as described as described above. The slide can be used for assays either directly or is incubated in the last 15° C. wash step in a solution containing 20 mg/mL Trehalose and freeze dried afterwards.
Determination of the Suitable Concentration of the Detection Antibody and Creation of a Calibration Curve:
Reaction Mix:

| | |
|---|---|
| cTNI depleted human EDTA-plasma + xµl cTNI spike | 60 µl |
| 500 mM Phosphate buffer pH7.5, 1M NaCL, 0.25% TRITON ™ X-100 | 20 µl |
| HBR-Plus (Scantibodies) | 10 µl |
| R-Phycoerythrin labeled detection antibody | y µl |
| Total volume | 100 µl |

To determine the suitable concentration of the detection antibody and to assess the detection limit and the dynamic range, a number of series of such reaction mixes need to be set up. Each series consists of reactions with different final cTNI concentrations. Typically, the cTNI concentrations in the reactions within each series vary from single digit pg/mL up to two digit ng/mL final concentrations of cTNI and negative probes without cTNI. The series differ in the concentration of the R-Phycoerythrin labelled detection antibody.

For the incubation with the analyte mixes the slide is covered with an incubation chamber as used in the polymerization step before. 65 µl of the reaction mix is filled into the chamber and the chamber is closed.

The slide is placed with the region containing the sensor matrix spots on a PELTIER element in direct contact with the heating/cooling element. In this sample, the PELTIER was a 30×30×4.7 mm, 19.3W (Quick-Ohm, Küpper & Co. GmbH, #QC-71-1.4-3.7M) capable of fast temperature cycling. The sample was subjected to a temperature cycle protocol with the following parameters:
Temperature 1: 37° C. for 10 seconds
Temperature 2: 25° C. for 10 seconds
25 cycles.

The Temperature is then set to 20° C., the incubation mix is removed and the incubation chamber is washed with wash buffer (50 mM Phosphate buffer pH7.5, 100 mM NaCL, 0.05% TRITON™ X-100) several times. The final wash volume is kept in the chamber and the temperature cycle protocol is applied once again for 10 cycles. Optionally, the wash process can be repeated several times, exchanging the wash fluid for every additional wash process.

For detection, the temperature is set to 37° C. This leads to shrinking of the pNIPAM sensor matrices and the enhancement of the fluorescence contrast. A digital image is taken of the area containing the sensor matrix spots. The fluorescence signal of each sensor matrix spot is measured and corrected for the local background. For a calibration curve, the median of all sensor matrix spot signals of each reaction mix of one series is plotted versus the cTNI concentration of the sample.

Optimum concentration of the labelled detection antibody is indicated by the lowest limit of detection and broadest dynamic measurement range.
Measuring the cTNI Concentration of Unknown Samples:
For each patient sample, a reaction mix is set up as follows:
Reaction Mix:

| | |
|---|---|
| Human patient EDTA-plasma | 60 µl |
| 500 mM Phosphate buffer pH7.5, 1M NaCL, 0.25% TRITON ™ X-100 | 20 µl |
| HBR-Plus (Scantibodies) | 10 µl |
| R-Phycoerythrin labelled detection antibody | x µl |
| Total volume | 100 µl |

The amount of R-Phycoerythrin labelled detection antibody (x) corresponds to the optimum values determined before. The sample is incubated, subjected to temperature cycles, washed, as described above. The signal is measured by imaging as described above. Absolute cTNI values can be calculated based on a calibration curve created separately or based on spiked cTNI sample(s) and negative control(s) assayed in parallel to the patient sample.

Example 4: Establishing a Combined Target Capture/Realtime Target Amplification Assay Using Biotin-Modified pNIPAM-Based Giant Amplification Beads (GABs)

Generation of Polymerisation Mixes for pNIPAM Particles with/Out Biotin-Modification to Perform PCR in Giant Amplification Beads (GABs)s
Component 1 (Aqueous Phase):
Creation of Biotin-Modified Monomer-Mix:

A Biotin-modified acrylic monomer was created in a separated reaction. The reaction mix consisted of Acrylic acid N-Hydroxysuccinimide ester (an activated aminoreactive Acrylic acid monomer) and Biotin-dPEG7-NH2 (A Biotin-derivative modified with a PEG7 spacer arm terminated with an amino group)

| | ~2.5% Biotin-modified monomer mix |
|---|---|
| PBS to a total Volumen of (mL) | 0.114 |
| Acrylic acid N-Hydroxysuccinimide ester (mg) | 2.8 |
| Biotin-dPEG7-NH2 (mg) | 10.0 |

The reaction mix was incubated for 30 minutes at 25° C. This mix was used without any further purification in pNIPAM polymerisation reactions.

| Components per mL Polymerisation mix | | | | |
|---|---|---|---|---|
| | Mix 1 | Mix 2 | Mix 3 | Mix 4 |
| 20% (w/v) N-Isopropylacrylamide (NIPAM) | 500 µl | 500 µl | 250 µl | 250 µl |
| 2.5% (w/v) N,N'-Methylenebisacrylamide | 40 µl | 40 µl | 20 µl | 20 µl |

-continued

Components per mL Polymerisation mix

|  | Mix 1 | Mix 2 | Mix 3 | Mix 4 |
|---|---|---|---|---|
| ~2.5% Biotin-modified monomer | 0 µl | 20 µl | 0 µl | 10 µl |
| 5% (w/v) Ammonium persulfate | 150 µl | 150 µl | 150 µl | 150 µl |
| Deionised water | 310 µl | 290 µl | 580 µl | 570 µl |
| Final volume | 1000 ul | 1000 µl | 1000 µl | 1000 µl |

Component 2 (Oil phase):

| Hexadecane | 4950 µl |
|---|---|
| N,N,N',N'-Tetramethylethylenediamine | 50 µl |

The mixes were separately evacuated and purged with argon in 4 evacuation-purge cycles, each. Afterwards, 50 µl of component 2 was aliquoted into each tube of 8-well PCR tube strips.

Then, a 2 µl aliquot of component 1 was pipetted into each of the tubes. The droplets were allowed to polymerise for 60 min at room temperature. Use of mix 1 and 2 delivers particles ("heads", "bodies") consisting of a crosslinked ~10% pNIPAM gel. Mix 3 and 4 delivers particles consisting of a crosslinked ~5% pNIPAM gel. Mixes 1 and 3 are without while mixes 2 and 4 are with Biotin-modified monomer. The 5% pNIPAM gel exhibit a larger pore width compared to the 10% pNIPAM gel. The percentage of the Gel and the crosslinking can be varied.

Recovery of the Particles and Transfer to the Aqueous Phase

After the polymerisation process is finished, 100 µl of H2O is added to each sample. The pNIPAM particle move into the aqueous phase and the hexadecane supernatant can be removed. To remove residual unpolymerized reagents and TEMED, the particles are heated to 50° C. to facilitate contraction for expelling the liquid from the particles. The excess of liquid is removed and 100 µl of H2O is added. Upon cooling down, H2O is taken up into the expanding particles. The washing cycle with heating, removing of liquid, adding new H2O and cooling down was repeated twice. Finally, H2O was exchanged by PBS containing 0.1% TRITON™ X-100.

Coating of GABs with Streptavidin

Coating of the GABs with streptavidin is accomplished in the washing buffer used before. The concentration of streptavidin is selected such as no accessible biotin remains on the surface of the GABs. In any case Streptavidin is applied in excess in order to avoid cross-linking of GABs. Optimal streptavidin concentration has been determined in preliminary tests with labelled Streptavidin by determining a plateau surface coverage. The particles created with mixes 2 and 4 were incubated with a solution of a Streptavidin in PBS containing 0.1% TRITON™ X-100. Particles created with mixes 1 and 3 (without Biotin-modification) were incubated with the same solution as negative control. After coupling with Streptavidin the GABs are washed three times with 100 µl PBS containing 0.1% TRITON™ X-100 to remove excess Streptavidin.

Incubation mixes:

| | Per particle |
|---|---|
| Streptavidin (2 mg/ml) in PBS, 0.1% TRITON ™ X-100 | 50 µl |

Application of GABs for Performing PCR

Preparation of Biolinylated HIV-1 cDNA

Biotinylated HIV-1 cDNA was generated by performing a reverse transcription in the presence of biotinylated reverse primer. The reaction mix was incubated for 15 minutes at 50° C. and the reaction was stopped by heating the reaction mix to 70° C. for 10 minutes.

Incubation mix:
  Purified HIV-1 RNA (~$10^6$ copies)
  1 µM biotinylated reverse primer 5' Biotin-ACT GAC GCT CTC GCA CCC ATC T-3'
  1× reaction buffer (cDNA Synthesis Kit Thermo Fisher)
  dNTPs (1 mM each)
  RevertAid Reverse Transcriptase (200 U, Thermo Fisher)
  The cDNA reaction mix is diluted with PBS 0.1% TRITON™ X-100 to yield a final concentration of ~$10^4$ cp/µl.

Enrichment of a HIV-1 cDNA Targets on GABs and Incubation of Those Beads with an Amplification Mix HIV-1 RNA labelled with biotin by reverse transcription is enriched on streptavidin-modified Giant Amplification Beads (GABs).

Incubation mix per particle:
  1 µl cDNA mix (~$10^4$ copies)
  49 µl PBS with 0.1% TRITON™ X-100

GABs are heated to 50° C. to expel the liquid phase from the particle. The liquid is removed and the incubation mix is added and the GABs are allowed to cool down. The mix is heated to 50° C. (for contraction) and cooled to room temperature (for expansion) three times and mixed in between to facilitate binding of biotinylated cDNA to the Streptavidin-labeled GABs. Finally the GABs are heated to 50° C. and the excess liquid is removed.

Subsequently a PCR-reaction mix is added at room temperature and the particle is heated up to 50° C. and cooled down again to facilitate the uptake of the PCR mix. Excess liquid is removed at room temperature and the GABs are covered with 25 µl mineral oil to prevent evaporation during the PCR reaction.

The PCR-mix consists of the following reagents (final concentrations):
  1× PCR buffer containing 6 mM $Mg^{2+}$, 20 mM Tris-HCl pH 8.9, 22 mM KCl, 22 mM $NH_4Cl$, 5% glycerol, 0.01% TRITON™ X-100 and 0.005% Tween 20, 1 mg/ml Sodiumpolyphosphate
  400 µM dNTPs (Invitrogen)
  0.8 µM forward primer: 5'-GCA GTG GCG CCC GAAC AGG-3' (Metabion international AG)
  0.8 µM reverse primer: 5'-ACT GAC GCT CTC GCA CCC ATC T-3'(Metabion international AG)
  0.8 µM hybridization probe: 5'-Cy5-CTC CGA CGC AAC GGG CTC G-BHQ3-3'
  Hot Start Taq DNA Polymerase, lyophilized (BiotechRabbit), 0.125 U/µl Alternatively, HIV-1 RNA can be enriched onto the Streptavidin labelled GABs without prior cDNA synthesis by incubating the sample containing the HIV-RNA with a suitable mixture of complementary capture oligonucleotides that are labelled with Biotin as described in Bruns and Steinmetzer [8]. Subsequently, the reverse transcription step is performed as part of a real-time reverse transcription PCR (rt RT-PCR) with the reverse transcriptase included into the RT-PCR mix as described therein.

Amplification Reaction in GABs

The PCR can be performed in any standard realtime cycler. The conditions listed below apply for the PeqSTAR 96Q The thermal conditions applied are:

Initial denaturation for 2 min at 95° C. followed by 5 cycles of Denaturation at 95° C. for 15 sec, Annealing at 65° C. for 30 sec and Extension at 72° C. for 30 sec. Then 40 cycles of Denaturation at 95° C. for 15 sec, Annealing at 65° C. for 20 sec and Extension at 72° C. for 30 sec take place. Amplification within the GAB is monitored in real time using the standard Cy5 detector settings. After in total 45 PCR cycles the positive controls showed ct-values of 19.5 (SD 0.84, N=12) whereas the negative controls showed no amplification signal.

Example 5: Application of pNIPAM-Based Mono Disperse Digital Amplification Beads (DABs) for Performing Digital PCR Here the present inventors describe the use of pNIPAM-based Digital Amplification Beads (DABs) to perform a digital PCR. In this application the DABs only provide a matrix that can be filled with aqueous solutions and emptied easily making use of the LCST behaviour of the pNIPAM polymer. The polymer also provides a matrix allowing to bring the aqueous phase contained in the particles into an oil emulsion. The advantage of using the DABs as a matrix is that a homogenous size distribution of water volumes in oil can be achieved without the need of using a microfluidic or other complicated technical device. In this experiment a cDNA created in a separate step was used as PCR template. When using RNA as template, the particles could be filled with an RT-PCR reaction mix and the whole process of RT-PCR process could be performed DAB based.

Generation of pNIPAM Particle Polymerisation Mixes for Digital PCR

| Component 1 (Aqueous phase): Components per mL Polymerisation mix | |
| --- | --- |
| | Reaction Mix |
| 20% (w/v) N-Isopropylacrylamide (NIPAM) | 250 µl |
| 2.5% (w/v) N,N'-Methylenebisacrylamide | 20 µl |
| 5% (w/v) Ammonium persulfate | 150 µl |
| Deionised water | 580 µl |

| Component 2 (Oil phase): | |
| --- | --- |
| Pico-Surf (TM) 1, 10 ml, 2% in Novec 7500 | 1485 µl |
| N,N,N',N'-Tetramethylethylenediamine | 15 µl |

The mixes were separately evacuated and purged with argon in 4 evacuation-purge cycles, each. Afterwards, the mixes were pipetted under argon atmosphere into the respective wells of a BioRad droplet generator chip DG8. 60 µl of the oil phase were given to each oil phase reservoir and 25 µl of the aqeous phase to each aqueous phase reservoir.

Then, the BioRad protocol for droplet generation was followed. (QX200TM Droplet Generator Instruction manual 10031907 RevC) Alternatively, the chip could be operated manually. For that purpose, a 50 mL syringe need to be connected by a tubing and a suitable adapter to the droplet reservoir of the droplet generator chip. Before connecting, the plunger is set to the 30 mL position. After filling in the aqueous and oil phase, the plunger is manually drawn to the 50 mL position to apply a defined pressure to the system. Just before the oil phase ore aqueous phase reservoir runs empty, the pressure is released.

The droplet reservoirs were covered with adhesive tape. The droplets were allowed to polymerise for 60 min at room temperature. The reaction delivers particles consisting of a crosslinked ~5% pNIPAM gel. The percentage of the Gel and the crosslinking can be varied.

Recovery of the Particles and Transfer to the Aqueous Phase

After the polymerisation process is finished as much as possible of the oil phase is gently withdrawn from the droplet reservoir using a pipette paying attention not to remove the pNIPAM particles. Then, 50 µl 1% (v/v) TRITON™ X-100 in water are pipetted to the particles. The volume is mixed by pipetting up and down such that the particles do not stick to the walls of the droplet chip. The volume is transferred to an Eppendorf Tube and the process is repeated once again. The transfer process can be monitored under a binocular microscope to prevent a major loss of particles in this step.

The tubes are then centrifuged at 2000 g for 1 min. Oil phase (bottom) and aqueous phase (top) are now well separated with an interphase containing the particles. 200 µl of a density gradient medium (Optiprep, Axis shield) is now pipetted slowly to the tube. It is important to prevent excessive mixing of the aqueous phase with the density gradient medium. Ideally, most of the density gradient medium slips under the particle phase. The tubes are centrifuged for 2 min at 2000 g. Afterwards, the density gradient medium phase is situated between the oil phase ad the particle phase. The particle phase can now be transferred to a new tube. In this step care need to be taken not to transfer any of the oil volume and as small of a volume as possible of the density gradient medium to the new tube.

1 mL of PBS, 0.1% (v/v) TRITON™ X-100 is added to the tube containing the particles. The volume is mixed and centrifuged at 2000 g for 2 min. The particles are now pelleted to the bottom of the tube. The supernatant is removed leaving the particles in the tube. 1 mL of PBS, 0.1% (v/v) TRITON™ X-100 is added to the tube again and the process of washing is repeated 5 times. Finally, the particles are taken up in water with 0.01% TRITON™ X-100. Subsequently, the concentration of the DABs is determined by counting under a microscope in a DHC-N01 (Neubauer Improved) counting chamber (INCYTO) or cytometrically on the CytoFlex flow cytometer (Beckman Coulter).

Preparation of HIV-1 cDNA Template

HIV-1 cDNA was generated by performing a reverse transcription in the presence of the PCR reverse primer. The reaction mix was incubated for 15 minutes at 50° C. and the reaction was stopped by heating the reaction mix to 70° C. for 10 minutes.

Incubation mix:
Purified HIV-1 RNA (~$10^6$ copies)
1 µM reverse primer 5' ACT GAC GCT CTC GCA CCC ATC T-3'
1× reaction buffer (cDNA Synthesis Kit Thermo Fisher)
dNTPs (1 mM each)
RevertAid Reverse Transcriptase (200 U, Thermo Fisher)

The cDNA reaction mix is diluted with PBS 0.1% TRITON™ X-100 to yield a final concentration of ~$10^4$ cp/µl.

Loading of the pNIPAM Based DABs with Amplification Mix

~100.000 pNIPAM DABs were transferred to a reaction tube and heated to 50° C. to expel the liquid phase from the particles. The particles are briefly spun at 2000 g and held at 40° C. The shrunken and pelleted particles stick together tightly such that the expelled liquid can be removed completely from the pellet.

10 µl of a PCR amplification mix containing 1000 copies of HIV cDNA was set up. The volume of the amplification mix needs to be smaller than the volume that can be taken up by the particles. This depends mainly on the number and size of the particles. In this example the particles used were capable of taking up a volume of 12 µl.

This mix consists of the following reagents (final concentrations):

- 1× PCR buffer containing 6 mM $Mg^{2+}$, 20 mM Tris-HCl pH 8.9, 22 mM KCl, 22 mM $NH_4Cl$, 5% glycerol, 0.01% TRITON™ X-100 and 0.005% Tween 20, 1 mg/ml Sodiumpolyphosphate
- 400 µM dNTPs (Invitrogen)
- 0.8 µM forward primer: 5'-GCA GTG GCG CCC GAAC AGG-3' (Metabion international AG)
- 0.8 µM reverse primer: 5'-ACT GAC GCT CTC GCA CCC ATC T-3'(Metabion international AG)
- 0.8 µM hybridization probe: 5'-CF647-CTC CGA CGC AAC GGG CTC G-BHQ3-3'
- 1000 copies of HIV-1 cDNA template
- Hot Start Taq DNA Polymerase, lyophilized (BiotechRabbit), 0.125 U/µl This mix was given to the particle pellet and incubated at 20° C. At this temperature the particles swell and take up the whole volume of the PCR reaction mix.

Compartmentalization by Dispersing of DABs in Oil

Micro-compartments with a defined volume are created by dispersing DABs in a fluorocarbon oil, e.g. PicoSurf™ 5% dispersed in Novec 7500 oil (Dolomite Microfluidics, #3200214. Instead of a heavy fluorocarbon oil a light mineral oil with emulsifier, e.g. Mineral oil (Sigma-Aldrich, #M5904 Sigma) with 5% (w/w) Span 80 (Sigma Aldrich, #85548) may be applied.

The particle pellet is brought in contact with an excess of oil in an Eppendorf tube. Ultrasound is applied until the DAB pellet is dispersed and the DABs are distributed homogenously. The pNIPAM DABs loaded with HIV-1 cDNA target are now emulsified in the oil phase. The oil with the DABs is transferred into a detection chamber with an area of approximately 2 cm² and a layer thickness of approximately 1 mm. The opposite surfaces of the chamber are made of transparent hydrophobic material. If a fluorocarbon oil is used, the DABs assemble as a monolayer (dense packing) on the hydrophobic upper surface due to the difference in density between the beads and the oil. If a mineral oil is applied the DABs will accumulate at the lower surface. Thus the DABs provide micro reaction containers for the subsequent digital PCR.

Amplification Reaction in DAB Micro-Compartments

DABs suspended in oil are subjected to the temperature cycling in the same chamber on a PELTIER element 30×30× 4.7 mm, 19.3W (Quick-Ohm, Küpper & Co. GmbH, #QC-71-1.4-3.7M). The DABs condense upon heating above 32° C. such that the reaction mix inside the DABs is expelled. It forms single aqueous droplets around the condensed DABs which serve as micro-reaction compartments where the amplification of individual cDNA molecules takes place.

The thermal conditions applied are:

Initial denaturation for 2 min at 95° C. followed by 45 cycles of Denaturation at 95° C. for sec, Annealing at 65° C. for 15 sec and Extension at 72° C. for 30 sec. Upon completion or the thermal protocol the content of the chamber is imaged at 21° C. in transmitted white light and fluorescence mode with excitation $\lambda exc=650$ nm and long pass emission of >670 nm. The total number of DABs and the number of those with a fluorescence signal above a defined intensity threshold are determined. The threshold value is derived from previously performed amplification reactions without template. The number of templates in the reaction is determined by applying the determined numbers of positive and negative droplets to Poisson statistics.

Example 6: Application of Biotin-Modified pNIPAM-Based Mono Disperse Amplification Beads (DABs) for Performing a Combined Target Capture/Digital PCR Assay This example describes the use of pNIPAM-based Digital Amplification Beads (DABs) ("sensor bodies" in accordance with embodiments of the present invention) to perform a combined nucleic acid target capture/digital PCR assay. In this application the DABs provide several functionalities:

1. They provide binding groups and the outer or inner and outer surface to capture the assay target in the place, where in further steps the amplification will occur.

2. They provide a matrix that can be filled with aqueous solutions and emptied easily making use of the LCST behaviour of the pNIPAM polymer.

3. The polymer also provides a matrix allowing to bring the aqueous phase contained in the particles into an oil emulsion. The advantage of using the DABs as a matrix is that a homogenous size distribution of water volumes in oil can be achieved without the need of using a microfluidic or other complicated technical device.

In this experiment a cDNA created in a separate step was used as PCR template. When using RNA as template, the particles could be filled with an RT-PCR reaction mix and the whole process of RT-PCR process could be performed DAB based.

Generation of pNIPAM Particle Polymerisation Mixes for Digital PCR

| Component 1 (Aqueous phase): Creation of Biotin-modified Monomer-Mix: A Biotin-modified acrylic monomer was created in a separated reaction. The reaction mix consisted of Acrylic acid N-Hydroxysuccinimide ester (an activated aminoreactive Acrylic acid monomer) and Biotin-dPEG7-NH2 (a Biotin-derivative modified with a PEG7 spacer arm terminated with an ammino group) | |
|---|---|
| | ~2.5% Biotin-modified monomer mix |
| PBS to a total Volume of (mL) | 0.114 |
| Acrylic acid N-Hydroxysuccinimide ester (mg) | 2.8 |
| Biotin-dPEG7-NH2 (mg) | 10.0 |

The reaction mix was incubated for 30 minutes at 25° C. This mix was used without any further purification in pNIPAM polymerisation reactions.

| Components per mL Polymerisation mix | |
| --- | --- |
| | Reaction mix |
| 20% (w/v) N-Isopropylacrylamide (NIPAM) | 250 µl |
| 2.5% (w/v) N,N'-Methylenebisacrylamide | 20 µl |
| ~2.5% Biotin-modified monomer mix | 10 µl |
| 5% (w/v) Ammonium persulfate | 150 µl |
| Deionised water | 570 µl |

| Component 2 (Oil phase): | |
| --- | --- |
| Pico-Surf (TM) 1, 10 ml, 2% in Novec 7500 | 1485 µl |
| N,N,N',N'-Tetramethylethylenediamine | 15 µl |

The mixes were separately evacuated and purged with argon in 4 evacuation-purge cycles, each. Afterwards, the mixes were pipetted under argon atmosphere into the respective wells of a BioRad droplet generator chip DG8. 60 µl of the oil phase were given to each oil phase reservoir and 25 µl of the aqueous phase to each aqueous phase reservoir.

Then, the BioRad protocol for droplet generation was followed (QX200™ Droplet Generator Instruction manual 10031907 RevC). Alternatively, the chip could be operated manually. For that purpose, a 50 mL syringe need to be connected by a tubing and a suitable adapter to the droplet reservoir of the droplet generator chip. Before connecting, the plunger is set to the 30 mL position. After filling in the aqueous and oil phase, the plunger is manually drawn to the 50 mL position to apply a defined pressure to the system. Just before the oil phase ore aqueous phase reservoir runs empty, the pressure is released.

The droplet reservoirs were covered with adhesive tape. The droplets were allowed to polymerise for 60 min at room temperature. Use of mix 1 delivers particles consisting of a crosslinked ~10% pNIPAM gel. Mix 2 delivers particles consisting of a crosslinked ~5% pNIPAM gel. The latter exhibit a larger pore width compared to the former. The percentage of the Gel and the crosslinking can be varied.

Recovery of the Particles ("Bodies") and Transfer to the Aqueous Phase

After the polymerisation process is finished as much as possible of the oil phase is gently withdrawn from the droplet reservoir using a pipette paying attention not to remove the pNIPAM particles. Then, 50 µl 1% (v/v) TRITON™ X-100 in water are pipetted to the particles. The volume is mixed by pipetting up and down such that the particles do not stick to the walls of the droplet chip. The volume is transferred to an Eppendorf Tube and the process is repeated once again. The transfer process can be monitored under a binocular microscope to prevent a major loss of particles in this step.

The tubes are then centrifuged at 2000 g for 1 min. Oil phase (bottom) and aqueous phase (top) are now well separated with an interphase containing the particles. 200 µl of a density gradient medium (Optiprep, Axis shield) is now pipetted slowly to the tube. It is important to prevent excessive mixing of the aqueous phase with the density gradient medium. Ideally, most of the density gradient medium slips under the particle phase. The tubes are centrifuged for 2 min at 2000 g. Afterwards, the density gradient medium phase is situated between the oil phase ad the particle phase. The particle phase can now be transferred to a new tube. In this step care need to be taken not to transfer any of the oil volume and as small of a volume as possible of the density gradient medium to the new tube.

1 mL of PBS, 0.1% (v/v) TRITON™ X-100 is added to the tube containing the particles. The volume is mixed and centrifuged at 2000 g for 2 min. The particles are now pelleted to the bottom of the tube. The supernatant is removed leaving the particles in the tube. 1 mL of PBS, 0.1% (v/v) TRITON™ X-100 is added to the tube again and the process of washing is repeated 5 times. Finally, the particles are taken up in PBS with 0.1% TRITON™ X-100.

Coating of DABs with Streptavidin

Coating of the DABs with streptavidin is accomplished in the washing buffer used before. The concentration of streptavidin is selected such that no accessible Biotin remains on the surface of the DABs. In any case Streptavidin is applied in excess in order to avoid cross-linking of DABs. Optimal streptavidin concentration has been determined in preliminary tests with labelled Streptavidin by determining a plateau surface coverage.

| Incubation mixes: | |
| --- | --- |
| | Per 100.000 particles |
| Streptavidin (2 mg/ml) in PBS, 0.1% TRITON ™ X-100 | 250 µl |

The coupling is done in an Eppendorf Thermoshaker with agitation of the solution at 350 rpm for 30 min and 5 temperature oscillations between 25° C. and 37° C. After coupling with Streptavidin the DABs are washed to remove excessive Streptavidin. 1 mL of PBS, 0.1% (v/v) TRITON™ X-100 is added to the tube containing the particles. The volume is mixed and the temperature is set to 40° C. The particles shrink and the inner liquid is expelled. Subsequently the particles are centrifuged at 2000 g and 40° C. for 2 min. The particles are now pelleted to the bottom of the tube. The supernatant is removed leaving the particles in the tube. 1 mL of 20° C. PBS, 0.1% (v/v) TRITON™ X-100 is added to the tube. The particle swell and take up the wash buffer. The volume is mixed and the temperature is set to 40° C. again. This process of washing is repeated 5 times. Finally, the particles are taken up in water with 0.01% TRITON™ X-100. Subsequently, the concentration of the DABs is determined by counting under a microscope in a DHC-N01 (Neubauer Improved) counting chamber (IN-CYTO) or cytometrically on the CytoFlex flow cytometer (Beckman Coulter).

Preparation of HIV-1 cDNA Template

Biotinylated HIV-1 cDNA was generated by performing a reverse transcription in the presence of the PCR reverse primer. The reaction mix was incubated for 15 minutes at 50° C. and the reaction was stopped by heating the reaction mix to 70° C. for 10 minutes.

Incubation mix:
Purified HIV-1 RNA (~$10^6$ copies)
1 µM biotinylated reverse primer 5' Biotin-ACT GAC GCT CTC GCA CCC ATC T-3'
1× reaction buffer (eDNA Synthesis Kit Thermo Fisher)
dNTPs (1 mM each)
RevertAid Reverse Transcriptase (200 U, Thermo Fisher)

The cDNA reaction mix is diluted with PBS 0.1% TRITON™ X-100 to yield a final concentration of ~$10^4$ cp/µl.

Capture of a HIV-1 cDNA Targets on DABs

HIV-1 RNA labelled with biotin by reverse transcription is captured on streptavidin-modified DABs ~100000 pNIPAM DABs were transferred to a reaction tube and heated to 50° C. to expel the liquid phase from the particles. The particles are briefly spun at 2000 g and held at 40° C. The shrunken and pelleted particles stick together tightly such that the expelled liquid can be removed completely from the pellet. Then, the following Incubation mix is added to the pellet 1 µl cDNA mix (~$10^4$ copies)

49 µl PBS with 0.1% TRITON™ X-100

Capturing is done in an Eppendorf Thermoshaker with agitation of the solution at 350 rpm for 30 min and 5 temperature oscillations between 25° C. and 37° C..

Loading of the pNIPAM Based DABs with Amplification Mix

After target capturing, the DABs heated to 50° C. to expel the liquid phase from the particles. The particles are briefly spun at 2000 g and held at 40° C. The shrunken and pelleted particles stick together tightly such that the expelled liquid can be removed completely from the pellet. 10 µl of a PCR amplification mix without template was set up. The volume of the amplification mix needs to be smaller than the volume that can be taken up by the particles. This depends mainly on the number and size of the particles. In this example the particles used were capable of taking up a volume of 12 µl.

This amplification mix consists of the following reagents (final concentrations):

1× PCR buffer containing 6 mM $Mg^{2+}$, 20 mM Tris-HCl pH 8.9, 22 mM KCl, 22 mM $NH_4Cl$, 5% glycerol, 0.01% TRITON™ X-100 and 0.005% Tween 20, 1 mg/ml Sodiumpolyphosphate 400 µM dNTPs (Invitrogen)

0.8 µM forward primer: 5-GCA GTG GCG CCC GAAC AGG-3' (Metabion international AG)

0.8 µM reverse primer: 5'-ACT GAC GCT CTC GCA CCC ATC T-3'(Metabion international AG)

0.8 µM hybridization probe: 5'-CF647-CTC CGA CGC AAC GGG CTC G-BHQ3-3'

Hot Start Taq DNA Polymerase, lyophilized (BiotechRabbit), 0.125 U/µl

This mix was given to the particle pellet and incubated at 20° C. At this temperature the particles swell and take up the whole volume of the PCR reaction mix.

Compartmentalization by Dispersing of DABs in Oil

Micro-compartments with a defined volume are created by dispersing DABs in a fluorocarbon oil, e.g. PicoSurf™ 5% dispersed in Novec 7500 oil (Dolomite Microfluidics, #3200214. Instead of a heavy fluorocarbon oil a light mineral oil with emulsifier, e.g. Mineral oil (Sigma-Aldrich, #M5904 Sigma) with 5% (w/w) Span 80 (Sigma Aldrich, #85548) may be applied.

The particle pellet is brought in contact with an excess of oil in an Eppendorf tube. Ultrasound is applied until the DAB pellet is dispersed and the DABs are distributed homogenously. The pNIPAM DABs loaded with HIV-1 cDNA target are now emulsified in the oil phase. The oil with the DABs is transferred into a detection chamber with an area of approximately 2 $cm^2$ and a layer thickness of approximately 1 mm. The opposite surfaces of the chamber are made of transparent hydrophobic material. If a fluorocarbon oil is used, the DABs assemble as a monolayer (dense packing) on the hydrophobic upper surface due to the difference in density between the beads and the oil. If a mineral oil is applied the DABs will accumulate at the lower surface. Thus the DABs provide micro reaction containers for the subsequent digital PCR.

Amplification Reaction in DAB Micro-Compartments

DABs suspended in oil are subjected to the temperature cycling in the same chamber on a PELTIER element 30×30× 4.7 mm, 19.3W (Quick-Ohm, Küpper & Co. GmbH, #QC-71-1.4-3.7M). The DABs condense upon heating above 32° C. such that the reaction mix inside the DABs is expelled. It forms single aqueous droplets around the condensed DABs which serve as micro-reaction compartments where the amplification of individual cDNA molecules takes place.

The thermal conditions applied are:

Initial denaturation for 2 min at 95° C. followed by 45 cycles of Denaturation at 95° C. for sec, Annealing at 65° C. for 15 sec and Extension at 72° C. for 30 sec. Upon completion or the thermal protocol the content of the chamber is imaged at 21° C. in transmitted white light and fluorescence mode with excitation λexc=650 nm and long pass emission of >670 nm. The total number of DABs and the number of those with a fluorescence signal above a defined intensity threshold are determined. The threshold value is derived from previously performed amplification reactions without template. The number of templates in the reaction is determined by applying the determined numbers of positive and negative droplets to Poisson statistics.

Example 7: Application of Biotin-Modified pNIPAM-Based Mono Disperse Digital Amplification Beads (DABs) to Establish a Digital ELISA Here the present inventors describe the process of establishing a digital immunoassay for the detection of human cTnI. The assay employs immuno-PCR in a digital format: The detection antibody is labelled with DNA. The capture antibody is labelled with Streptavidin and coated on Biotin modified pNIPAM particle. A Sandwich complex of the particle bound capture antibody the antigen and the DNA-labelled detection antibody is formed in a process that employs temperature cycling to pump the analyte towards the particle surface and any unbound material away from the particle surface. Unbound detection antibody, and thus the DNA label, is removed by appropriate washing steps employing temperature cycling. The pNIPAM based DABs are loaded with PCR amplification mix and suspended in oil so that separate reaction compartments are formed. In the subsequent droplet PCR bound DNA-label is detected.

Detection Antibodies

The cTnI detection antibody (clone 10C9, SDIX) is labeled using the Thunder-Link® PLUS Oligo Conjugation System (Innova Bioscience) according to the manufacturer's protocol and then purified. The following sequence is coupled to the antibodies:

5'GCGTCAGACCCCGTAGAAAAGATCAAAGGATCTTCTTGAGATCCTTT

TTTTCTGCGCGTAATCTGCTGCTTGCAAACAAAAAAACCACCGCTACCA

GCGGTGGTTTGTTTGCCGGATCAAGAGCT3'

Capture Antibody:

Clone TPC-110 (SDIX) is used as a capture antibody. This was marked by Lightning link Streptavidin (Innova Bioscience) according to the manufacturer's protocol.

Preparation and Recovery of pNPAM Detection Particles

Preparation of Biotin-modified pNIPAM detection particles was carried out according to the methods described in embodiment 1 with the following modification. After transferring the biotin-labelled pNIPAM particles into the aqueous phase and eliminating unsuitable particle sizes in the exemplary embodiment, the particles are coated with the Streptavidin-labeled capture antibody.

Coating of pNIPAM detection particles with Streptavidin labelled capture antibody Coating of the pNIPAM with Streptavidin labelled capture antibody is accomplished in PBS, 0.1% TRITON™ X-100. The concentration of the Streptavidin labelled capture antibody is selected such that the occurrence of false positive signals is minimized and good sensitivity is achieved Optimal capture antibody concentration has been determined in preliminary tests (see below). The coupling is done in an Eppendorf Thermoshaker with agitation of the solution at 350 rpm for 30 min and 5 temperature oscillations between 25° C. and 37° C. After coupling with the capture antibody the particles are washed several times by pelleting and exchanging the supernatant as described above. Subsequently, the concentration of the pNIPAM-particles is determined by counting under a microscope in a counting chamber. The concentration of the particles is adjusted to about 5.000/µl. The particles are aliquoted in units of 20 µl.

Optimization of Antibody Concentration:

Optimal concentration of DNA labelled detection and particle bound capture antibodies is determined by conventional immuno-PCR. The concentrations of the two antibodies were systematically varied and immuno-complexes using Troponin-free plasma (negative controls) and troponin-free plasma with defined amounts of spiked Troponin I generated. These were captured on particles, washed and subjected to conventional PCR. Optimum concentration of the respective antibodies is indicated by the lowest limit of detection and broadest dynamic measurement range.

Forming of the Immune Complex and its Capture:

| Reaction mix: | |
|---|---|
| Human EDTA-plasma | 50 µl |
| 500 mM Phosphate buffer pH7.5, 1M NaCL, 0.25% TRITON ™ X-100 | 20 µl |
| HBR-Plus (Scantibodies) | 10 µl |
| DNA labelled detection antibody | y µl |
| pNIPAM detetction particles coated with capture antibody | 20 µl |
| Total volume | ~100 µl |

Generating and Capturing the Immune-Complex and Washing.

~100 µl of reaction mixture (see above) is prepared with the previously determined optimum concentrations. Capturing is done in an Eppendorf Thermoshaker with agitation of the solution at 350 rpm for 30 min and 5 temperature oscillations between 25° C. and 37° C. After capturing the DABs are washed to remove non-specifically bound detection antibody. 1 mL of PBS, 0.1% (v/v) TRITON™ X-100 is added to the tube containing the particles. The volume is mixed and the temperature is set to 40° C. The particles shrink and the inner liquid is expelled. Subsequently the particles are centrifuged at 2000 g and 40° C. for 2 min. The particles are now pelleted to the bottom of the tube. The supernatant is removed leaving the particles in the tube. 1 mL of 20° C. PBS, 0.1% (v/v) TRITON™ X-100 is added to the tube. The particle swell and take up the wash buffer. The volume is mixed and the temperature is set to 40° C. again. This process of washing is repeated several times until false positive signals are in a range allowing the lower level of quantification that needs to be reached (To be determined experimentally). Subsequently, two additional washing steps with 1× Taq DNA polymerase PCR buffer [20 mM Tris HCl (pH 8.4), 50 mM KCl] are performed.

Loading of the pNIPAM Based DABs with Amplification Mix

After target capturing, the DABs heated to 50° C. to expel the liquid phase from the particles. The particles are briefly spun at 2000 g and held at 40° C. The shrunken and pelleted particles stick together tightly such that the expelled liquid can be removed completely from the pellet. 10 µl of a PCR amplification mix without template was set up. The volume of the amplification mix needs to be smaller than the volume that can be taken up by the particles. This depends mainly on the number and size of the particles. In this example the particles used were capable of taking up a volume of 14 µl.

This amplification mix consists of the following reagents (final concentrations):

A PCR reaction mixture (volume 10 µl) having the following composition is prepared:

500 nM fw-Primer (5' AGCTCTTGATCCGGCAAACA 3')

500 nM rev-Primer (5' GCGTCAGACCCCGTAGAAAA 3')

SYBR® Green I nucleic acid gel stain (Sigma-Aldrich, #S9430) 1:25000

1× PCR-Mastermix

PCR grade Water

This mix was given to the particle pellet and incubated at 20° C. At this temperature the particles swell and take up the whole volume of the PCR reaction mix.

Compartmentalization by Dispersing of DABs in Oil

Micro-compartments with a defined volume are created by dispersing DABs in a fluorocarbon oil, e.g. PicoSurf™ 5% dispersed in Novec 7500 oil (Dolomite Microfluidics, #3200214. Instead of a heavy fluorocarbon oil a light mineral oil with emulsifier, e.g. Mineral oil (Sigma-Aldrich, #M5904 Sigma) with 5% (w/w) Span 80 (Sigma Aldrich, #85548) may be applied.

The particle pellet is brought in contact with an excess of oil in an Eppendorf tube. Ultrasound is applied until the DAB pellet is dispersed and the DABs are distributed homogenously. The pNIPAM DABs loaded with HIV-1 cDNA target are now emulsified in the oil phase. The oil with the DABs is transferred into a detection chamber with an area of approximately 2 cm$^2$ and a layer thickness of approximately 1 mm. The opposite surfaces of the chamber are made of transparent hydrophobic material. If a fluorocarbon oil is used, the DABs assemble as a monolayer (dense packing) on the hydrophobic upper surface due to the difference in density between the beads and the oil. If a mineral oil is applied the DABs will accumulate at the lower surface. Thus the DABs provide micro reaction containers for the subsequent digital PCR.

Amplification Reaction in DAB Micro-Compartments

DABs suspended in oil are subjected to the temperature cycling in the same chamber on a PETTIER element 30×30× 4.7 mm, 19.3W (Quick-Ohm. Küpper & Co. GmbI, #QC-71-1.4-3.7M). The DABs condense upon heating above 32° C. such that the reaction mix inside the DABs is expelled. It forms single aqueous droplets around the condensed DABs which serve as micro-reaction compartments where the amplification of individual DNA molecules takes place.

PCR amplification is performed over 40 cycles with the following parameters:
Cycle 1:
  5 min 95° C.
  30 sec 65° C.
  30 sec 72° C.
Cycle 2-40:
  30 sec 94° C.
  30 sec 65° C.
  30 sec 72° C.

After completing amplification the SYBR green signal of the individual particles is detected by means of fluorescence microscopy. Data analysis is performed according to established algorithms for digital PCR.

Determining the Optimal Dynamic Measurement Range

Nonspecific binding of DNA-labeled detection antibody to DABs represents a critical parameter that limits the applicability of digital immuno-PCR. Non-specifically bound label results in false-positive DABs after amplification. Therefore, in digital immuno-PCR the quantification of the analyte is achieved by determining the difference between a positive sample and a negative control.

In one extreme scenario nonspecific binding of the detection antibody can lead to a majority of DABs with a false-positive signal in control reactions without analytes. This is mitigated by reducing the effective concentration of the detection antibody, either by gradually reducing the concentration of the detection antibody in the assay or maintaining the antibody concentration by increasing dilution of the DNA-labeled detection antibody with the same antibody without DNA label.

Example 8: Enrichment and Detection of an Antigen in an Immunoassay Format

Here the present inventors describe enrichment and detection of an antigen using the sensor bodies according to the present invention.

Sensor bodies ("beads") according to the present invention composed of the thermo-responsive polymer pNIPAM in combination with thermocycling capability offer the opportunity to enrich and detect an antigen. Work with prototype beads made by the present inventors led to a simple one-step protocol with labelled detection antibody, streptavidin-labelled capture antibody and biotinylated pNIPAM particles as the employed reagents. The principle of such an embodiment is shown in FIG. 8. All steps are performed within a single reaction vessel ("container"), and no transfer step is required. When the reagents are mixed with EDTA-plasma containing NS1-antigen and subjected to several cycles of thermocycling (e.g. 40×[40° C.-20° C.], 10 s cycle time) efficient binding of the sandwich complex is achieved. This is explained by repetitive swelling and contraction of the particle leading to substantial material flow across the binding surface which ensures effective capture from liquid in close proximity to the particle. This effect is optionally complemented by movement of the liquid by pumping the entire reaction mix back and forth within the chamber ("container", "reaction vessel") in order to achieve efficient macroscopic liquid exchange around each particle. A substantial signal increase is obtained when particles are fluorescence imaged at the contracted state (Temperature above lower critical solution temperature (LCST, e.g. 40° C.) as shown in FIG. 9. Images of the fluorescent particles are shown at optimal exposure settings of the detector whereas the graph in FIG. 9 in the upper panel is normalized to 1 s exposure time. The detectable signal in the contracted state has been found strong enough for most formulations in order to discriminate particle bound signal indicating analyte binding from background fluorescence caused by unbound fluorescent detection antibody.

In order to achieve a mechanical agitation of the liquid sample in the container, a syringe pump was programmed to perform the repetitive movement of the liquid incubated in the container while a computer controlled Peltier element was used for simultaneous temperature cycling.

Various particles/sensor bodies were synthesised according to different recipes 1-6 (with the numbers 1-6 indicated underneath the respective bars in the graph of FIG. 9); the particles differed in terms of polymer concentrations, types and concentrations of co-monomers and the degree of cross-linking. More specifically, the particle/sensor body compositions were as follows:

|  | 1 | 2 | 3 | 4 | 5 | 6 |
|---|---|---|---|---|---|---|
| aqueous phase | | | | | | |
| 20% NIPAM | 89 μl | 89 μl | 89 μl | 89 μl | 89 μl | / |
| 15% NIPAM | / | / | / | / | / | 116.4 μl |
| 2% BIS | 3 μl | 3 μl | 3 μl | 3 μl | 3 μl | 3 μl |
| 5% APS | 30.6 μl | 30.6 μl | 30.6 μl | 30.6 μl | 30.6 μl | 30.6 μl |
| Acrylat PEG 5000 Biotin | 40 μl | 40 μl | 40 μl | 50 μl | 50 μl | 50 μl |
| distilled water | 37.4 μl | 37.4 μl | 35.4 μl | 27.4 μl | 27.4 μl | 0 μl |
| TEMED | / | / | 2 μl | / | / | / |
| oil phase | | | | | | |
| Novec | 1188 μl | 1188 μl | 1188 μl | 1188 μl | 1188 μl | / |
| Picosurf | 792 μl | 792 μl | 812 μl | 792 μl | 792 μl | 1980 μl |
| TEMED | 20 μl | 20 μl | / | 20 μl | 20 μl | 20 μl |

|   | 1 | 2 | 3 | 4 | 5 | 6 |
|---|---|---|---|---|---|---|
| temperature of all reagents | not equilibrated | not equilibrated | not equilibrated | not equilibrated | equilibrated to 28° C. | not equilibrated |
| supernatant after preparation | yes | no | yes | yes | yes | yes |
| pellet after preparation | no | yes | no | no | no | no |

It turned out that even without elaborate optimization the one-step immunoassay showed good performance. Dilution samples of spiked NS1 Serotype2 from ICL have been assayed with 01961-Streptavidin as capture antibody and 1838-RPE as detection antibody. With a total assay time of about 4-5 minutes the assay is very fast and simple to perform (mixing all reagents with sample). As can be seen in FIG. 10, EDTA-plasma spiked with antigen concentration of 2 ng/mL can repetitively and clearly be discriminated from negative control samples (Plasma without spiked NS1). No washing steps or transfer steps are required. Also shown is a negative control (sample without NS1 spike) for which the particle can be just about discerned, but there is no measurable (fluorescence) signal 1. Lottspeich, F., J. W. Engels, and Z. L. Solodkoff, *Bioanalytik*. 2012: Spektrum Akademischer Verlag.
2. Dinis-Oliveira, R. J., *Heterogeneous and homogeneous immunoassays for drug analysis*. Bioanalysis, 2014. 6 (21): p. 2877-96.
3. Cohen, L. and D. R. Walt, *Single-Molecule Arrays for Protein and Nucleic Acid Analysis*. Annu Rev Anal Chem (Palo Alto Calif), 2017.
4. Haaijman, J. J., F. J. Bloemmen, and C. M. Ham, *Microfluorometric immunoassays with antigens bound to sepharose beads*. Ann N Y Acad Sci, 1975. 254: p. 137-50.
5. Auditore-Hargreaves, K., et al., *Phase-separation immunoassays*. Clin Chem, 1987. 33(9): p. 1509-16.
6. Monji Nobuo, S.W.A.U.S., et al., *THERMALLY INDUCED PHASE SEPARATION IMMUNOASSAY\IMMUNOTESTVERFAHREN MITTELS THERMISCH INDUZIERTER PHASETRENNUNG\ANALYSE IMMUNOLOGIQUE A SEPARATION DE PHASE INDUITE THERMIQUEMENT, S.W.U.S.G.S.C.U.S. Genetic Systems Corporation, Editor.* 1991: EP.
7. Monji, N. and A. S. Hoffman, *A novel immunoassay system and bioseparation process based on thermal phase separating polymers*. Appl Biochem Biotechnol, 1987. 14(2): p. 107-20.
8. Bruns T., Steinmetzer K.; Guidelines for the quantification of HIV and HCV in small volume whole blood samples. Methods in Molecular Biology (Clifton N. J.); 2012; 903; pp. 35-50.

Further modifications of the preferred embodiments are possible without leaving the scope of the invention, which is solely defined by the claims.

The features of the present invention disclosed in the specification, the claims, and/or in the accompanying drawings may, both separately and in any combination thereof, be material for realizing the invention in various forms thereof.

The invention claimed is:

1. A method of binding an analyte to a prefabricated particulate sensor body, said method comprising the steps:
   a) providing, in any order, a prefabricated particulate sensor body for binding or enriching an analyte, and an aqueous sample suspected of containing an analyte; wherein a diameter of said prefabricated particulate sensor body is in a range of from 1 μm to 1 mm, and wherein said prefabricated particulate sensor body comprises a porous polymeric scaffold and an interstitial pore space within said porous polymeric scaffold, wherein said porous polymeric scaffold is composed of a polymer responsive to a change of at least one external condition to which said prefabricated particulate sensor body is exposed, and wherein one or more capture agents for an analyte is/are attached to said porous polymeric scaffold;
   b) exposing said prefabricated particulate sensor body to said aqueous sample, thereby allowing an analyte present in said sample to bind to said prefabricated particulate sensor body and allowing liquid to enter said interstitial pore space of said prefabricated particulate sensor body.

2. A method of enriching and/or washing an analyte bound to a prefabricated particulate sensor body, said method comprising the steps:
   c) performing the method according to claim 1;
   d) changing the state of said prefabricated particulate sensor body from an expanded to a contracted state and thereby displacing said liquid contained in said interstitial pore space of said prefabricated particulate sensor body, by changing at least one external condition to which said prefabricated particulate sensor body is exposed;
   e) changing the state of said prefabricated particulate sensor body from a contracted to an expanded state and thereby allowing liquid to enter said interstitial pore space of said prefabricated particulate sensor body, by changing at least one external condition to which said prefabricated particulate sensor body is exposed;

wherein steps d) and e) are performed after step c) when the analyte has been bound to said prefabricated particulate sensor body, and wherein the analyte is either labelled or unlabelled;

wherein steps d) and e) are repeated n-times, wherein n is an integer in a range of from 1-1000.

3. The method of claim 2, wherein, during performance of said steps c)-e), said prefabricated particulate sensor body is surrounded by said aqueous sample, and during at least one of said steps c)-e), said aqueous sample is agitated, thus causing a liquid exchange around said prefabricated particulate sensor body.

4. A method of detecting an analyte in a sample, said method comprising the steps:
   performing the method according to claim 1; wherein the analyte is or becomes labelled either before, during or after binding said analyte to said prefabricated particulate sensor body;
   detecting the analyte bound to said sensor body by detecting the label bound to said prefabricated particulate sensor body.

5. The method according to claim 1, which is performed in a single reaction vessel.

* * * * *

SEQUENCE LISTING

```
<160> NUMBER OF SEQ ID NOS: 10

<210> SEQ ID NO 1
<211> LENGTH: 22
<212> TYPE: DNA
<213> ORGANISM: Artificial Sequence
<220> FEATURE:
<223> OTHER INFORMATION: biotinylated reverse primer

<400> SEQUENCE: 1
actgacgctc tcgcacccat ct                                          22

<210> SEQ ID NO 2
<211> LENGTH: 19
<212> TYPE: DNA
<213> ORGANISM: Artificial Sequence
<220> FEATURE:
<223> OTHER INFORMATION: forward primer

<400> SEQUENCE: 2
gcagtggcgc ccgaacagg                                              19

<210> SEQ ID NO 3
<211> LENGTH: 22
<212> TYPE: DNA
<213> ORGANISM: Artificial Sequence
```

```
<220> FEATURE:
<223> OTHER INFORMATION: reverse primer

<400> SEQUENCE: 3
actgacgctc tcgcacccat ct                                              22

<210> SEQ ID NO 4
<211> LENGTH: 19
<212> TYPE: DNA
<213> ORGANISM: Artificial Sequence
<220> FEATURE:
<223> OTHER INFORMATION: hybridization probe labeled with Cy5

<400> SEQUENCE: 4
ctccgacgca acgggctcg                                                  19

<210> SEQ ID NO 5
<211> LENGTH: 19
<212> TYPE: DNA
<213> ORGANISM: Artificial Sequence
<220> FEATURE:
<223> OTHER INFORMATION: hybridization probe labeled with Cy3

<400> SEQUENCE: 5
ctccgacgca acgggctcg                                                  19

<210> SEQ ID NO 6
<211> LENGTH: 125
<212> TYPE: DNA
<213> ORGANISM: Artificial Sequence
<220> FEATURE:
<223> OTHER INFORMATION: DNA label

<400> SEQUENCE: 6
gcgtcagacc ccgtagaaaa gatcaaagga tcttcttgag atccttttt tctgcgcgta      60 atctgctgct tgcaaacaaa aaaccaccg ctaccagcgg tggtttgttt gccggatcaa    120
gagct                                                                125

<210> SEQ ID NO 7
<211> LENGTH: 20
<212> TYPE: DNA
<213> ORGANISM: Artificial Sequence
<220> FEATURE:
<223> OTHER INFORMATION: forward primer

<400> SEQUENCE: 7
agctcttgat ccggcaaaca                                                 20

<210> SEQ ID NO 8
<211> LENGTH: 20
<212> TYPE: DNA
<213> ORGANISM: Artificial Sequence
<220> FEATURE:
<223> OTHER INFORMATION: reverse primer

<400> SEQUENCE: 8
gcgtcagacc ccgtagaaaa                                                 20

<210> SEQ ID NO 9
<211> LENGTH: 9
<212> TYPE: PRT
<213> ORGANISM: Artificial Sequence
<220> FEATURE:
<223> OTHER INFORMATION: Strep-tag
```

```
<400> SEQUENCE: 9

Ala Trp Arg His Pro Gln Phe Gly Gly
1               5

<210> SEQ ID NO 10
<211> LENGTH: 9
<212> TYPE: PRT
<213> ORGANISM: Artificial Sequence
<220> FEATURE:
<223> OTHER INFORMATION: Strep-tag II

<400> SEQUENCE: 10

Asn Trp Ser His Pro Gln Phe Glu Lys
1               5
```